(12) United States Patent
Rausch et al.

(10) Patent No.: US 12,291,410 B2
(45) Date of Patent: May 6, 2025

(54) BULK MATERIAL HANDLING METHODS, SYSTEMS, SUBSYSTEMS, AND APPARATUSES

(71) Applicant: Owens-Brockway Glass Container Inc., Perrysburg, OH (US)

(72) Inventors: Philip J. Rausch, Perrysburg, OH (US); Kirk Holmes, Perrysburg, OH (US); Karin Gabriela Bastarrachea, Perrysburg, OH (US); Steven Will, Sylvania, OH (US); Roger Smith, Perrysburg, OH (US); Manfred Robert Romstöck, Freudenberg (DE); Guenther Josef Mlynar, Wertheim-Bettingen (DE)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 659 days.

(21) Appl. No.: 17/492,554

(22) Filed: Oct. 1, 2021

(65) Prior Publication Data
US 2022/0106133 A1    Apr. 7, 2022

Related U.S. Application Data

(63) Continuation-in-part of application No. 17/061,302, filed on Oct. 1, 2020, now Pat. No. 11,912,608.

(51) Int. Cl.
*B65G 53/04* (2006.01)
*B65G 3/04* (2006.01)
(Continued)

(52) U.S. Cl.
CPC ............. *B65G 53/04* (2013.01); *B65G 3/04* (2013.01); *B65G 43/00* (2013.01); *G01G 17/04* (2013.01); *B65G 2201/042* (2013.01)

(58) Field of Classification Search
CPC .... B65G 3/04; B65G 43/00; B65G 2201/042; B65G 65/40; B65G 67/06; G01G 17/04; G01G 13/028
See application file for complete search history.

(56) References Cited

U.S. PATENT DOCUMENTS

| 4,142,880 | A | 3/1979 | Wenda et al. |
| RE30,674 | E | 7/1981 | Wenda et al. |

(Continued)

FOREIGN PATENT DOCUMENTS

| CN | 107555764 | | 1/2018 |
| CN | 107555764 | A | 1/2018 |
| DE | 2044237 | A1 | 5/1971 |
| DE | 19526212 | A1 | 1/1997 |
| EP | 0555171 | A2 | 8/1993 |
| ES | 1037414 | U | 2/1998 |

(Continued)

OTHER PUBLICATIONS

PCT Invitation to Pay Additional Fees, Where applicable, Protest Fee, Int. App. No. PCT/US2021/053252, Int. Filing Date: Oct. 1, 2021, Dated: Jan. 20, 2022.

(Continued)

*Primary Examiner* — Vishal Pancholi

(57) ABSTRACT

A bulk material handling method includes: a) receiving and pneumatically conveying bulk material via pressurized dilute phase, dense phase, and/or hybrid dilute/dense phase, and/or vacuum drawn conveyance into bulk material containers; b) storing the bulk material in the containers; c) dispensing the bulk material from the containers into a bulk material transporter; d) transporting the transporter from the containers to a bulk material transmitting vessel; and e) discharging the bulk material from the transporter into the transmitting vessel, including releasing the bulk material from the transporter into the transmitting vessel, and pneumatically transmitting the bulk material out of the transmitting vessel to downstream bulk material processing equipment. Discharging also may include rejecting the bulk (Continued)

material from the transporter to a waste container. A related system, subsystems, and apparatuses are also disclosed.

20 Claims, 20 Drawing Sheets

(51) Int. Cl.
  *B65G 43/00* (2006.01)
  *G01G 17/04* (2006.01)

(56) References Cited

U.S. PATENT DOCUMENTS

| | | | |
|---|---|---|---|
| 4,953,752 | A | 9/1990 | Tousignant et al. |
| 5,037,246 | A | 8/1991 | Okano et al. |
| 5,413,154 | A | 5/1995 | Hurst, Jr. et al. |
| 5,415,323 | A | 6/1995 | Fenelon |
| 6,266,390 | B1 | 7/2001 | Sommer, Jr. et al. |
| 6,269,852 | B1 | 8/2001 | Muhr |
| 6,366,353 | B1 | 4/2002 | Brown et al. |
| 6,888,917 | B2 | 5/2005 | Sommer, Jr. et al. |
| 7,017,371 | B2 | 3/2006 | Juul et al. |
| 7,165,927 | B2 | 1/2007 | Doherty et al. |
| 7,351,929 | B2 | 4/2008 | Afsari et al. |
| 7,355,140 | B1 | 4/2008 | Afsari et al. |
| 7,384,230 | B2 | 6/2008 | Pfeiffer et al. |
| 7,441,999 | B2 | 10/2008 | Nakao et al. |
| 7,528,957 | B2 | 5/2009 | Lewis et al. |
| 7,682,123 | B2 | 3/2010 | Bachrach |
| 7,753,639 | B2 | 7/2010 | Hoshino |
| 7,771,153 | B2 | 8/2010 | Doherty et al. |
| 7,924,414 | B2 | 4/2011 | Mound |
| 7,955,574 | B2 | 6/2011 | Fryxell et al. |
| 7,972,104 | B2 | 7/2011 | Shiwaku et al. |
| 8,197,172 | B2 | 6/2012 | Doherty et al. |
| 8,425,173 | B2 | 4/2013 | Lert et al. |
| 8,436,268 | B1 | 5/2013 | Afsari et al. |
| 8,456,633 | B2 | 6/2013 | Lewis et al. |
| 8,561,652 | B2 | 10/2013 | Bordere et al. |
| 8,585,341 | B1 | 11/2013 | Oren et al. |
| 8,696,010 | B2 | 4/2014 | Toebes et al. |
| 8,833,582 | B1 | 9/2014 | Ellis et al. |
| 8,864,365 | B2 | 10/2014 | Rodgers |
| 8,902,422 | B2 | 12/2014 | Chesner et al. |
| 8,919,801 | B2 | 12/2014 | Toebes et al. |
| 8,951,029 | B2 | 2/2015 | Wilkie |
| 9,010,073 | B2 | 4/2015 | Stamm Kristensen et al. |
| 9,073,691 | B2 | 7/2015 | Morimoto et al. |
| 9,090,393 | B2 | 7/2015 | Ellis et al. |
| 9,126,740 | B2 | 9/2015 | Ellis et al. |
| 9,126,741 | B2 | 9/2015 | Ellis et al. |
| 9,156,394 | B2 | 10/2015 | Toebes et al. |
| 9,227,780 | B2 | 1/2016 | Krohn |
| 9,290,400 | B2 | 3/2016 | Kunisa et al. |
| 9,321,591 | B2 | 4/2016 | Lert et al. |
| 9,327,903 | B2 | 5/2016 | Toebes et al. |
| 9,428,330 | B2 | 8/2016 | Lopez |
| 9,505,556 | B2 | 11/2016 | Razumov |
| 9,539,927 | B2 | 1/2017 | Fitzgerald et al. |
| 9,567,157 | B2 | 2/2017 | Scudder et al. |
| 9,592,959 | B2 | 3/2017 | Kinugawa et al. |
| 9,617,075 | B2 | 4/2017 | Porat |
| 9,620,397 | B2 | 4/2017 | Doherty et al. |
| 9,688,178 | B2 | 6/2017 | Pham |
| 9,700,175 | B2 | 7/2017 | King |
| 9,752,389 | B2 | 9/2017 | Pham et al. |
| 9,776,194 | B2 | 10/2017 | Schindler |
| 9,776,813 | B2 | 10/2017 | McMahon |
| 9,810,363 | B2 | 11/2017 | Ganzer et al. |
| 9,827,683 | B1 | 11/2017 | Hance et al. |
| 9,862,538 | B2 | 1/2018 | Pham et al. |
| 9,881,823 | B2 | 1/2018 | Doherty et al. |
| 9,930,837 | B2 | 4/2018 | Rowling |
| 9,938,093 | B2 | 4/2018 | Sherwood et al. |
| 9,956,609 | B1 | 5/2018 | De Saro et al. |
| 10,059,535 | B2 | 8/2018 | Herman et al. |
| 10,059,536 | B2 | 8/2018 | Tomioka et al. |
| 10,065,798 | B2 | 9/2018 | Borders et al. |
| 10,077,610 | B2 | 9/2018 | Pham et al. |
| 10,099,391 | B2 | 10/2018 | Hance et al. |
| 10,141,212 | B2 | 11/2018 | Doherty et al. |
| 10,147,627 | B2 | 12/2018 | Doherty et al. |
| 10,167,146 | B2 | 1/2019 | Johnston |
| 10,202,239 | B2 | 2/2019 | Razumov |
| 10,265,871 | B2 | 4/2019 | Hance et al. |
| 10,280,000 | B2 | 5/2019 | Sullivan et al. |
| 10,280,001 | B2 | 5/2019 | Oki et al. |
| 10,381,251 | B2 | 8/2019 | Doherty et al. |
| 10,442,614 | B2 | 10/2019 | Lucas et al. |
| 10,479,255 | B2 | 11/2019 | Krenek et al. |
| 10,507,992 | B2 | 12/2019 | Tackett et al. |
| 10,526,136 | B2 | 1/2020 | Hawkins et al. |
| 10,569,242 | B2 | 2/2020 | Stegemoeller et al. |
| 2002/0025244 | A1 | 2/2002 | Kim |
| 2006/0243301 | A1 | 11/2006 | LeMond et al. |
| 2007/0014185 | A1 | 1/2007 | Diosse et al. |
| 2009/0008410 | A1 | 1/2009 | Kosich |
| 2009/0078410 | A1 | 3/2009 | Krenek et al. |
| 2010/0193077 | A1 | 8/2010 | Nelson et al. |
| 2010/0229980 | A1 | 9/2010 | Achenbach et al. |
| 2010/0233772 | A1 | 9/2010 | Achenbach et al. |
| 2010/0284768 | A1 | 11/2010 | Olin-nunez et al. |
| 2011/0284027 | A1* | 11/2011 | Logan ............... B63B 27/29 134/10 |
| 2012/0144863 | A1 | 6/2012 | Shinohara et al. |
| 2013/0036711 | A1* | 2/2013 | Scudder ............ B65D 90/048 220/666 |
| 2013/0048148 | A1 | 2/2013 | Matye |
| 2014/0041322 | A1 | 2/2014 | Pham et al. |
| 2014/0044508 | A1 | 2/2014 | Luharuka et al. |
| 2015/0044003 | A1 | 2/2015 | Pham |
| 2015/0044004 | A1 | 2/2015 | Pham et al. |
| 2015/0191304 | A1 | 7/2015 | Herman et al. |
| 2015/0203286 | A1 | 7/2015 | Ness |
| 2015/0225187 | A1 | 8/2015 | Razumov |
| 2015/0360856 | A1 | 12/2015 | Oren et al. |
| 2015/0368039 | A1 | 12/2015 | Cochrum et al. |
| 2016/0039433 | A1 | 2/2016 | Oren et al. |
| 2016/0130095 | A1 | 5/2016 | Oren et al. |
| 2016/0244279 | A1 | 8/2016 | Oren et al. |
| 2016/0251152 | A1 | 9/2016 | Krupa |
| 2016/0297065 | A1 | 10/2016 | Lopez |
| 2016/0297605 | A1 | 10/2016 | Lopez |
| 2018/0002120 | A1 | 1/2018 | Allegretti et al. |
| 2018/0141752 | A1 | 5/2018 | Nakanishi et al. |
| 2018/0243800 | A1 | 8/2018 | Kumar et al. |
| 2018/0361670 | A1* | 12/2018 | Kobayashi ............ B33Y 30/00 |
| 2019/0023484 | A1 | 1/2019 | Shin |
| 2019/0106273 | A1 | 4/2019 | Hess et al. |
| 2019/0119038 | A1 | 4/2019 | Komelsen et al. |
| 2019/0127147 | A1 | 5/2019 | Wagner et al. |
| 2019/0129371 | A1 | 5/2019 | Wagner et al. |
| 2019/0129399 | A1 | 5/2019 | Wagner et al. |
| 2019/0135555 | A1 | 5/2019 | Wagner et al. |
| 2019/0217258 | A1 | 7/2019 | Bishop |
| 2019/0218044 | A1 | 7/2019 | Keskitalo et al. |
| 2019/0241356 | A1* | 8/2019 | Schaffner ............... B65G 65/40 |
| 2019/0248578 | A1* | 8/2019 | Managan, II ......... B01F 35/881 |
| 2019/0256281 | A1 | 8/2019 | Cochrum et al. |
| 2019/0276225 | A1 | 9/2019 | Warren et al. |
| 2019/0291141 | A1 | 9/2019 | Koyanaka et al. |
| 2019/0322505 | A1 | 10/2019 | Tengvert et al. |
| 2020/0031639 | A1 | 1/2020 | Rauwolf |
| 2020/0047997 | A1 | 2/2020 | Van Staalduinen |
| 2020/0079584 | A1 | 3/2020 | Hawkins et al. |
| 2020/0095060 | A1 | 3/2020 | Hawkins et al. |
| 2020/0102147 | A1 | 4/2020 | Sullivan et al. |
| 2020/0118853 | A1 | 4/2020 | Harasaki |
| 2020/0199990 | A1 | 6/2020 | Friesen |
| 2020/0223648 | A1 | 7/2020 | Herman et al. |

(56) References Cited

U.S. PATENT DOCUMENTS

| | | | |
|---|---|---|---|
| 2020/0262641 A1 | 8/2020 | Friesen | |
| 2021/0016959 A1* | 1/2021 | Morales Serrano | ... B65D 88/28 |

FOREIGN PATENT DOCUMENTS

| | | |
|---|---|---|
| GB | 1269060 | 3/1972 |
| GB | 1422449 A | 1/1976 |
| GB | 2430451 A | 3/2007 |
| WO | WO02/100741 A1 | 12/2002 |
| WO | WO2004/063729 A1 | 7/2004 |
| WO | WO 2018/094678 A1 | 5/2018 |
| WO | WO2019/206438 A1 | 10/2018 |
| WO | WO201972992 A1 | 4/2019 |
| WO | WO2019072992 A1 | 4/2019 |
| WO | WO2019/154434 A2 | 8/2019 |
| WO | WO2019/199588 A1 | 10/2019 |
| WO | WO2019/206437 A1 | 10/2019 |
| WO | WO2019/238673 A1 | 12/2019 |
| WO | WO2020/019064 A1 | 1/2020 |
| WO | WO2020/074242 A1 | 4/2020 |

OTHER PUBLICATIONS

PCT Invitation to Pay Additional Fees, PCT Int.Serial No. PCT/US2021/053259, Int. Filing Date: Oct. 1, 2021, Applicant: Owens-Brockway Glass Container Inc. Date:May 19, 2022.

Int. Preliminary Report on Patentability, Int. Serial No. PCT/US2015/041543, Int. Filing Date: Jul. 22, 2015, Applicant: Halliburton Energy Services, Inc., Mailed: Jan. 23, 2018.

Int. Preliminary Report on Patentability, Int. Serial No. PCT/US2016/044496, Int. Filing Date: Jul. 28, 2016, Applicant: Halliburton Energy Services, Inc. Mailed: Jan. 29, 2019.

US Office Action, U.S. Appl. No. 16/308,945, filed Dec. 11, 2018, Mail Date: Apr. 13, 2020.

US Notice of Allowance, U.S. Appl. No. 11/684,972, filed Mar. 12, 2007, Mail Date: Dec. 6, 2010.

Ingredient Masters Inc. website, Bulk Bags (FIBC Bulk Bags), https://www.ingredientmasters.com/bulk-bags/ , Date: May 16, 2019.

PCT Search Report and Written Opinion, Int. Serial No. PCT/US2021/053264, Int. Filing Date: Oct. 1, 2021, Applicant: Owens-Brockway Glass Container Inc., Mail Date: Feb. 4, 2022.

PCT Search Report and Written Opinion, Int. Serial No. PCT/US2021/053252, Int. Filing Date:Oct. 1, 2021, Applicant: Owens-Brockway Glass Container Inc., Mail Date: Mar. 14, 2022.

PCT Search Report and Written Opinion, Int. Serial No. PCT/US2021/053261, Int. Filing Date:Oct. 1, 2021, Applicant: Owens-Brockway Glass Container Inc., Mail Date: Apr. 12, 22.

PCT Invitation to Pay Additional Fees,PCT Int.Serial No. PCT/US2021/053246, Int. Filing Date: Oct. 1, 2021, Applicant: Owens-Brockway Glass Container Inc. Date:May 19, 2022.

PCT Int. Search Report and Written Opinion, PCT Int.Serial No. PCT/US2021/053261, Int. Filing Date: Oct. 1, 2021, Applicant: Owens-Brockway Glass Container Inc. Date:Apr. 12, 2022.

* cited by examiner

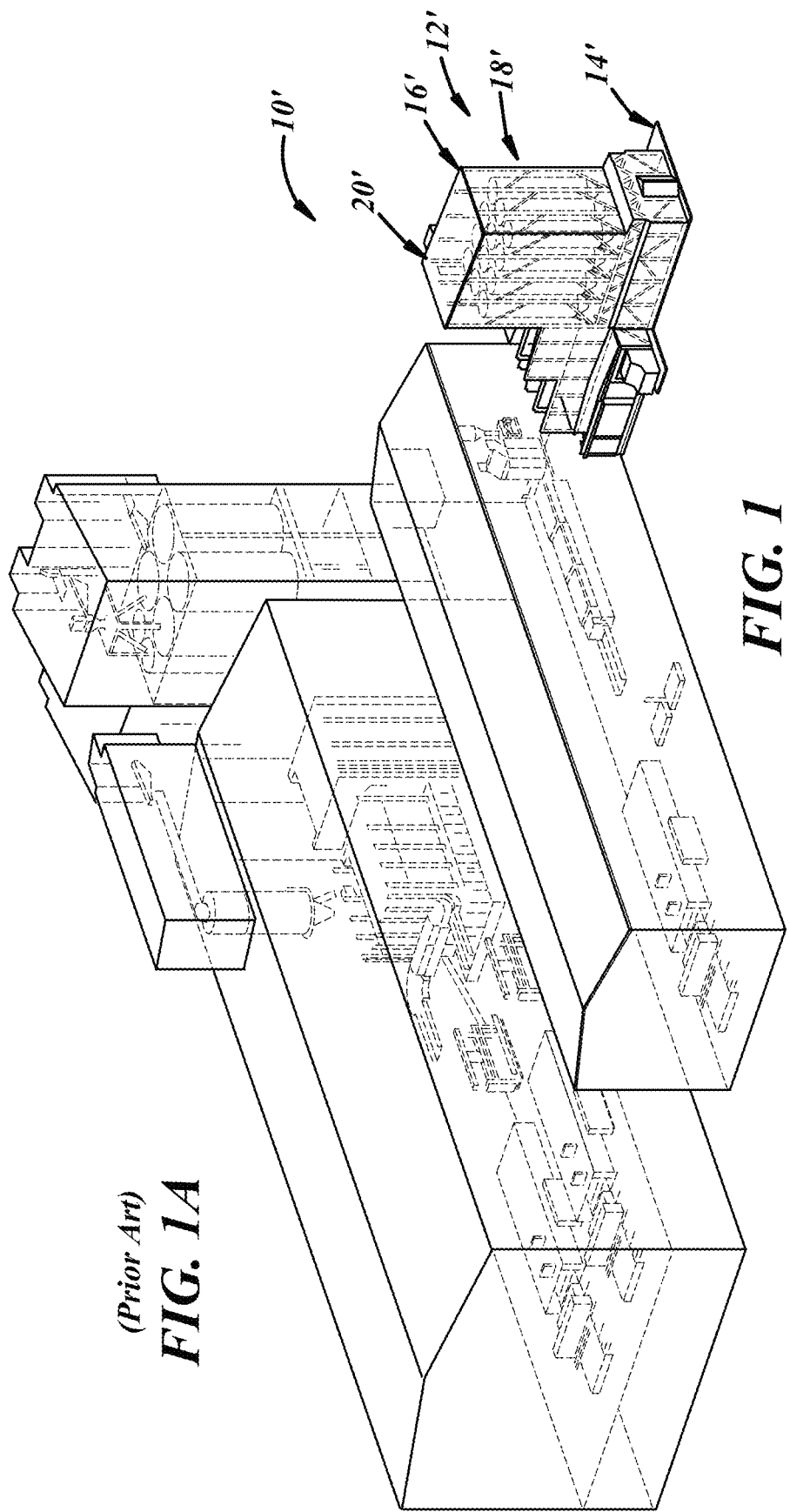

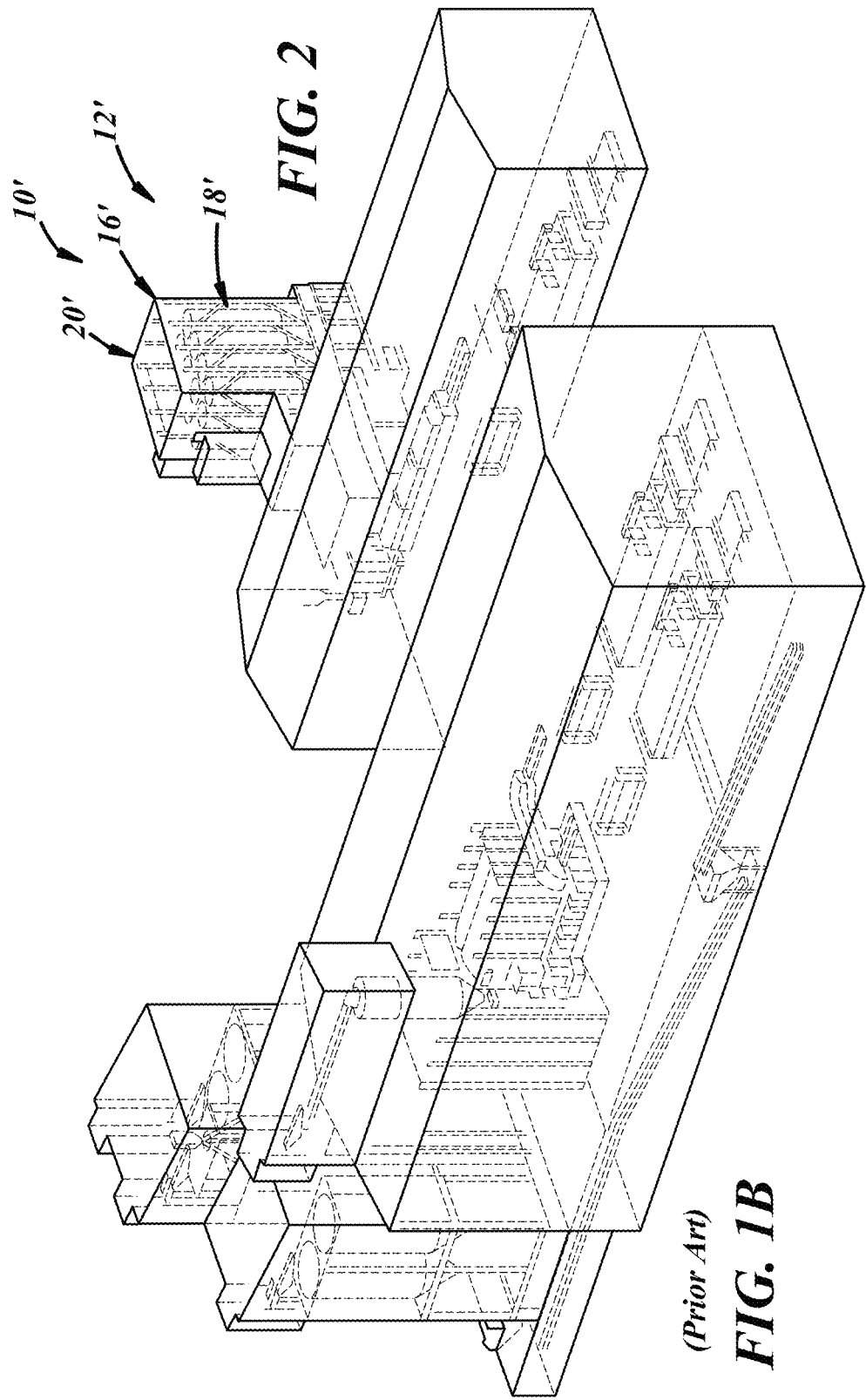

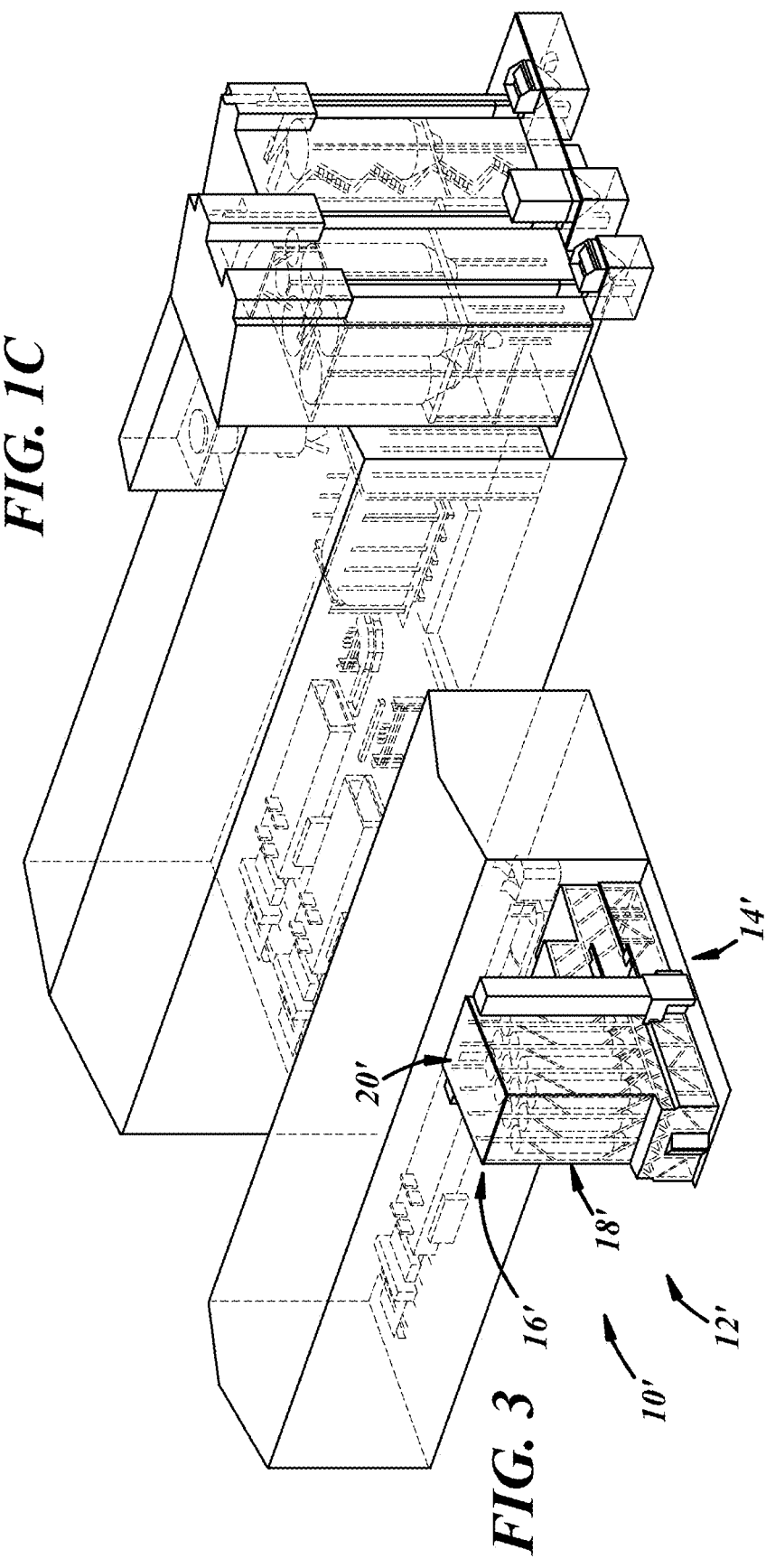

BULK MATERIAL HANDLING METHODS, SYSTEMS, SUBSYSTEMS, AND APPARATUSES

TECHNICAL FIELD

This patent application discloses innovations to material handling and, more particularly, to bulk material handling including pneumatic receiving and conveying, storing, gravity dispensing, vehicular transporting, and pneumatic discharging of bulk materials.

BACKGROUND

A conventional glass "batch house" includes a custom architectural installation specifically designed for glass manufacturing, and a glass batch house system supported and sheltered by the architectural installation. With reference to prior art FIGS. 1A through 1E, a conventional glass container batch house is illustrated and described as an example. Those of ordinary skill in the art would recognize that other glass batch houses, for example, for producing glass fibers, glass display screens, architectural glass, vehicle glass, or any other glass products, share many aspects with a glass container batch house. The conventional custom glass batch house architectural installation includes a feedstock subsystem that includes a "batch house" building located outside of the factory building.

The batch house building towers over the factory building and is generally configured to receive and store feedstock or "glass batch" including raw materials, for example, sand, soda ash, and limestone, and also including cullet in the form of recycled, scrap, or waste glass. The batch house is usually several stories tall, and includes a covered unloading platform and a pit to receive the glass batch from underneath railcars or trucks that arrive loaded with glass batch materials. The batch house also includes multi-story silos to store the glass batch, and glass batch elevators and glass batch conveyors to move the glass batch from the pit to tops of the silos. The batch house further includes cullet pads at ground level to receive and store cullet, crushers to crush cullet to a size suitable for melting, and cullet elevators and conveyors to move crushed cullet to one of the silos in the batch house. The batch house additionally includes batch mixers to mix the glass batch received from the silos, conveyors with scales to weigh and deliver each glass batch material from the silos to the mixers, mixer conveyors to move the glass batch from the mixers to the hot-end subsystem, and dust collectors to collect dust from the various equipment.

With reference to FIGS. 1B-1E, the height of a conventional batch house architectural installation is about 95 feet (29 meters) above a forming floor level and about 18 feet (5.5 meters) below the forming floor level, the length of the batch house architectural installation is about 95 feet (29 meters), and the width of the batch house architectural installation is about 61 feet (18.5 meters).

Accordingly, the batch house requires a specialized, dedicated, and permanent architectural installation including a pit, and a two to three story building. The time to construct a new glass batch house of the conventional type is about one to two years. And a conventional batch house cannot be easily relocated from one plant to another. The batch house installation occupies a large footprint of about 5,800 square feet or about 540 square meters, and a large volumetric envelope of about 655,000 cubic feet or about 18,550 cubic meters. Such a size for a conventional glass container batch house supports a production output of about 140 tons of glass per day. Accordingly, a capacity-adjusted size of the batch house can be characterized by the volumetric envelope of the batch house divided by the production output enabled by the batch house, which is about 133 cubic meters per each ton of glass produced per day. As used herein, the term "about" means within plus or minus five percent.

SUMMARY OF THE DISCLOSURE

The present disclosure embodies a number of aspects that can be implemented separately from or in combination with each other.

In accordance with an aspect of the present disclosure, a bulk material handling system includes a bulk material storage and dispensing subsystem, a bulk material discharging subsystem, and a bulk material transport subsystem. The storage and dispensing system includes bulk material conduit to receive bulk material from outside the system and convey the bulk material under pressure, bulk material containers in downstream pneumatic communication with the bulk material conduit to receive and store the bulk material, and bulk material dispensing equipment in communication with the bulk material containers to receive the bulk material from the bulk material containers and dispense the bulk material within the system. The discharging subsystem includes a bulk material transmitting vessel to discharge the bulk material out of the system, and a transporter handler. The transporter is configured to receive bulk material from the bulk material storage and dispensing subsystem, be transported between the bulk material storage and dispensing subsystem and the bulk material discharging subsystem, be lifted and conveyed by the transporter handler of the bulk material discharging subsystem over the bulk material transmitting vessel of the bulk material discharging subsystem, and release the bulk material received from the bulk material storage and dispensing subsystem into the bulk material transmitting vessel.

In accordance with another aspect of the present disclosure, a bulk material handling method includes receiving bulk material and pneumatically conveying the bulk material via at least one of pressurized dilute phase, pressurized dense phase, hybrid dilute/dense phase, or vacuum draw conveyance into bulk material containers. The method also includes storing the bulk material in the bulk material containers, dispensing the bulk material from the bulk material containers into a bulk material transporter, and transporting the bulk material transporter from the bulk material containers to a bulk material discharging system. The method further includes discharging the bulk material out of the bulk material transporter, including releasing the bulk material from the bulk material transporter into a bulk material transmitting vessel, and pneumatically transmitting the bulk material out of the bulk material transmitting vessel to downstream bulk material processing equipment.

BRIEF DESCRIPTION OF THE DRAWINGS

FIG. 1A is a front perspective schematic view of a conventional glass factory and glass batch house for the factory, in accordance with the prior art, and drawn to scale.

FIG. 1B is another front perspective view of the factory and glass batch house of FIG. 1A.

FIG. 1C is a rear perspective schematic view of the factory and glass batch house of FIG. 1A.

FIG. 1 is a front perspective schematic view of a glass factory and bulk material handling system for the factory, in accordance with an illustrative embodiment of the present disclosure, and drawn to scale.

FIG. 2 is another front perspective view of the factory and system of FIG. 1.

FIG. 3 is a rear perspective schematic view of the factory and system of FIG. 1.

DETAILED DESCRIPTION

Figure 4:
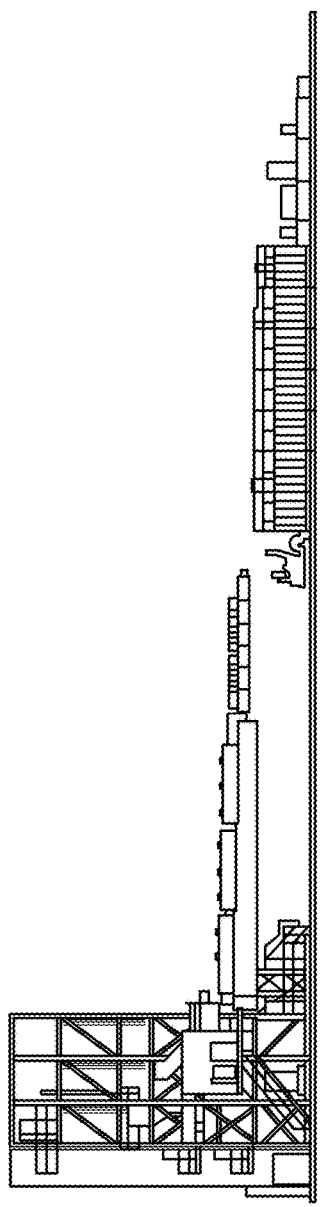
FIG. 4 is an elevational schematic view of the factory and system of FIG. 1.
Figure 1D:
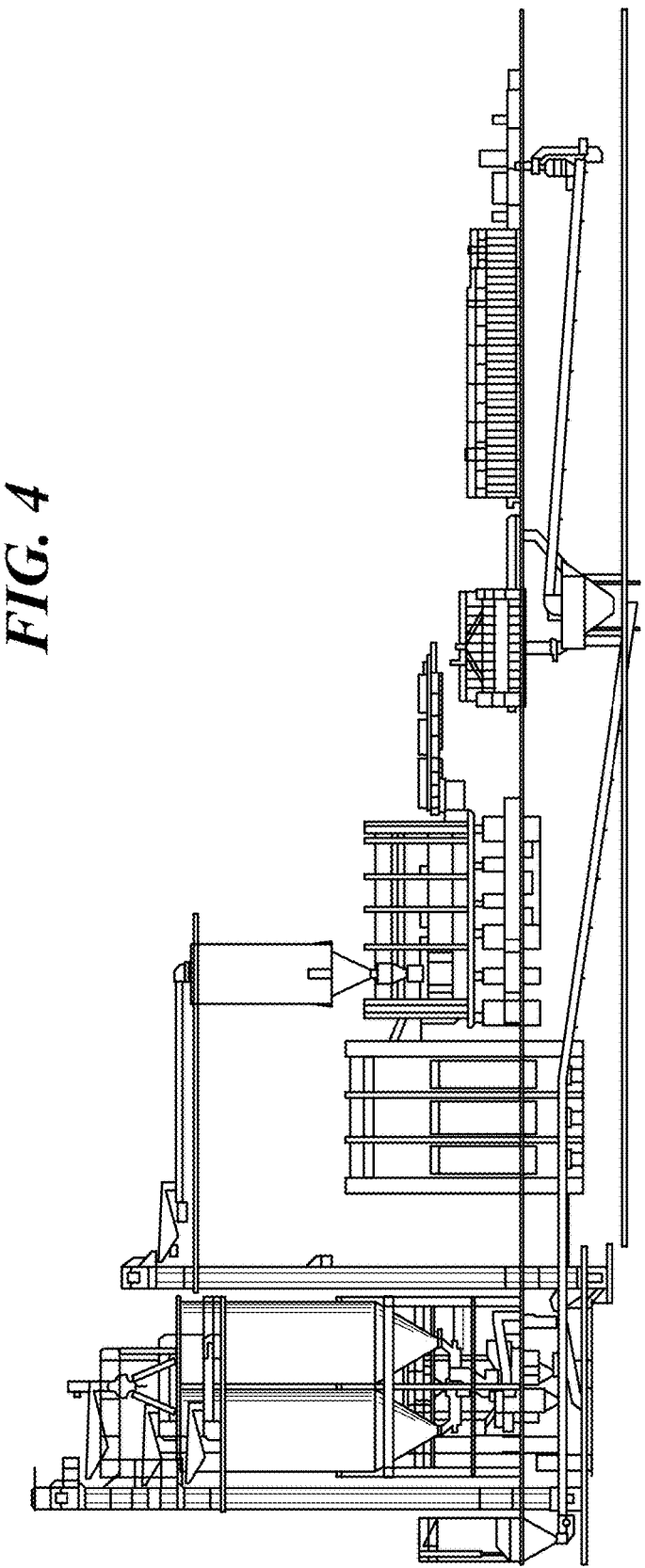
FIG. 1D is an elevational schematic view of the factory and glass batch house of FIG. 1A.
Figure 5:
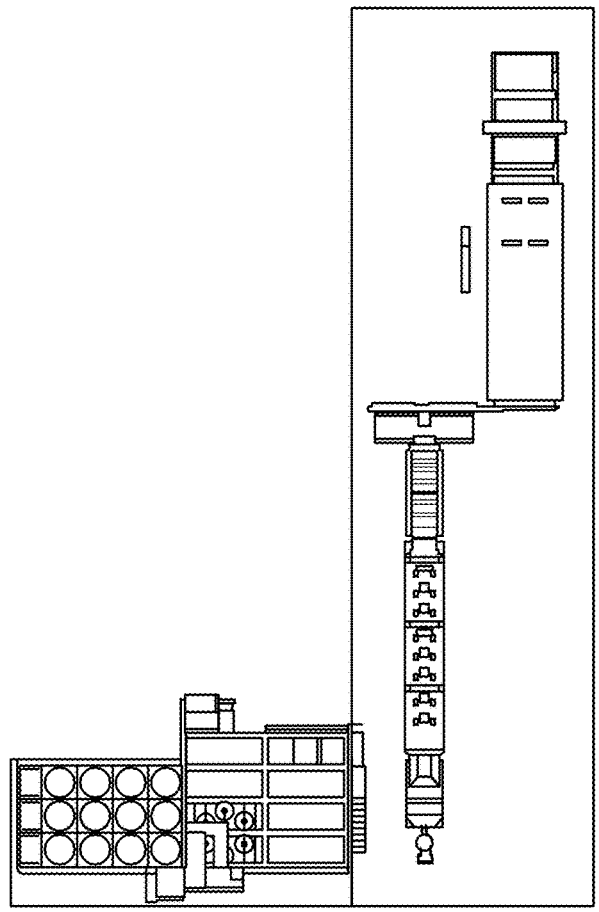
FIG. 5 is a plan schematic view of the factory and system of FIG. 1.
Figure 1E:
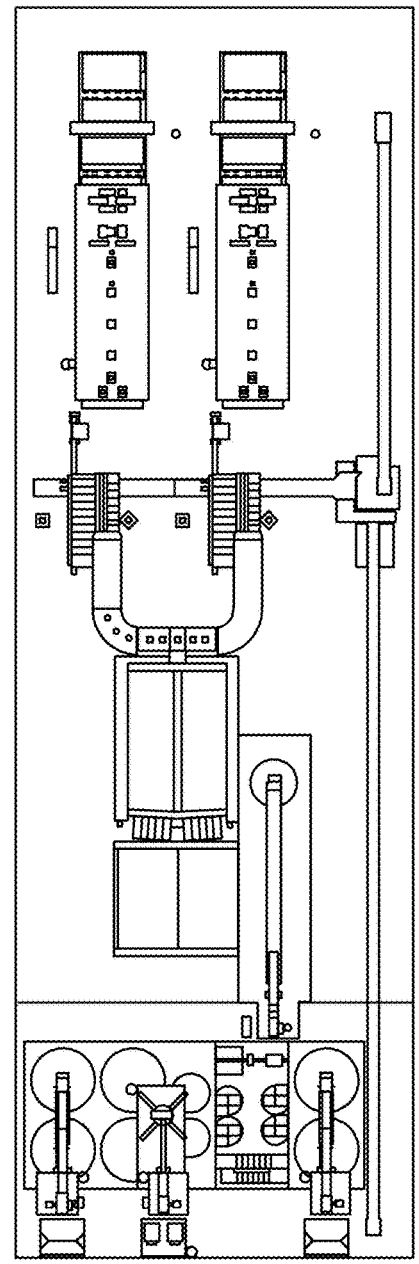
FIG. 1E is a plan schematic view of the factory and glass batch house of FIG. 1A.

In general, a new bulk material handling system is illustrated and described with reference to a glass feedstock handling system for a glass container factory as an example. Those of ordinary skill in the art would recognize that other glass factories, for example, for producing glass fibers, glass display screens, architectural glass, vehicle glass, or any other glass products, share many aspects with a glass container factory. Accordingly, the presently disclosed and claimed subject matter is not necessarily limited to glass containers, glass container feedstock handling systems, and glass container factories and, instead, encompasses any glass products, glass product feedstock handling systems, and glass product factories. Moreover, the presently disclosed and claimed subject matter is not necessarily limited to bulk material handling for the glass industry and, instead, encompasses any products, bulk material handling systems, and factories in any industry in which bulk material handling is useful.

Although conventional glass batch houses and methods enable efficient production of high-quality products for large-scale production runs, the presently disclosed subject matter introduces a revolutionary bulk material handling system that is simpler than a conventional batch house, is modular and mobile, and is more compact and economical at least for smaller scale production runs or incremental additions to existing large-scale production runs. More specifically, in accordance with an aspect of the present disclosure, the system may include prefabricated modular equipment configurations that involve rapid construction of the system in about three to six months, simplify production capacity expansion in smaller increments and at lower capital cost than conventional glass batch houses, and render the system mobile and easily moved from one standard industrial location to another, completely unlike conventional glass batch houses that require dedicated, customized, permanent installations that take a much longer time to construct. In accordance with another aspect of the present disclosure, the bulk material handling system need not include a conventional batch house or any one or more of the following conventional batch house elements: basements or pits, for example, to receive glass batch from underneath railcars or trucks, or glass batch elevators, or glass batch mixers. Accordingly, a permanent site and facility in a heavy industrial zone need not be purchased; rather, an existing site and facility for the system can be temporarily leased in a light industrial zone, until it is desirable to relocate the system to another site and facility. In accordance with a further aspect of the present disclosure, the new bulk material handling system has a footprint and volumetric envelope that are significantly reduced compared to that of conventional glass batch houses, as described in further detail below.

More specifically, with reference to FIGS. 1-5, the new architectural installation is much smaller than a conventional batch house installation. For example, the bulk material handling building 16 occupies a smaller footprint of about 3,500 square feet or about 325 square meters. The height of the new architectural installation may be about 54 feet (16.5 meters) to 57 feet (17.4 meters) above floor level, the length of the new architectural installation may be about 78 feet (23.8 meters) to 81 feet (24.7 meters), and the width of the new architectural installation may be about 33 feet (10.1 meters) to 35 feet (10.7 meters). In another example, with reference to FIGS. 6A and 7A, the bulk material handling building has a smaller volumetric envelope of about 189,000 cubic feet or about 5,350 cubic meters. Thus, the architectural installation of the new system occupies a footprint and volumetric envelope much smaller than that of conventional batch houses. As used herein, the term "about" means within plus or minus five percent.

The new bulk material handling system is sized to support production output of a glass manufacturing system or factory at about 110 TPD. Accordingly, a capacity-adjusted size of the presently disclosed bulk material handling system can be characterized by the volumetric envelope of the presently disclosed bulk material handling system divided by the glass production output supported by the system. For example, the bulk material handling building size of about 5,350 cubic meters is divided by 110 TPD for a capacity-adjusted size of about 49 cubic meters per each ton of glass produced per day by a glass manufacturing system supported by the bulk material handling system.

The capacity-adjusted size of the bulk material handling building is less than 50 cubic meters per each ton of glass produced per day by the glass container factory supported by the bulk material handling system, certainly less than 75 cubic meters per each ton of glass produced per day, and much less than the 125+ cubic meters per each ton of glass produced per day of the conventional factory. Accordingly, the capacity-adjusted size of the bulk material handling building is about 49 cubic meters per each ton of glass produced each day. Thus, the capacity-adjusted size of the presently disclosed bulk material handling building may be less than half, or even less than a quarter, that of the conventional batch house. Therefore, and because the presently disclosed system is modular, the system is particularly amenable to being scaled up to support any desired output. For instance, the system can be replicated in multiples, for example, to accommodate expansion of a glass factory supported by the system.

Additionally, although shown as a separate architectural installation in the drawing figures, at least a portion of the architectural installation of the bulk material handling system may be integrated with an architectural installation of hot and cold end systems of a glass container manufacturing plant. For example, a majors subsystem of the bulk material handling system and the enclosure and foundation portion of the bulk material handling building corresponding to the majors subsystem may be located outside of the architectural installation of the hot and cold end subsystems, and the rest of the bulk material handling system may be located within the enclosure of the architectural installation of the hot and cold end subsystems with no increase—and perhaps some decrease—in footprint or volumetric envelope described above. In another example, a weatherproof majors subsystem may be located outside of the architectural installation of the hot and cold end subsystems on a suitable foundation, and access to the majors subsystem may be provided by an above ground enclosed tunnel or hallway traversable by automatically guided vehicles.

With specific reference now to FIGS. 1-3, 6A, and 6B, a new bulk material handling system 10' includes a new architectural installation 12' and new subsystems and equipment supported and sheltered by the installation 12'. The installation 12' includes a concrete foundation 14' having a floor which may include, for example, a four to six-inch-thick slab, and a bulk material handling building 16' on the foundation including walls 18' and a roof 20'. The installation 12 requires no basement and no pit below the floor, such that the concrete foundation has earthen material directly underneath, wherein the foundation slab establishes the floor. As used herein, the term "pit" includes an elevator pit, conveyor pit, loading pit, and the like, located below grade or below ground level and that may require excavation of earthen material to form. As used herein, the term "basement" includes the lowest habitable level of the bulk material handling building below a floor of the building and can include a first level or a below grade or below ground level portion that may require excavation of earthen material.

Figure 6A:
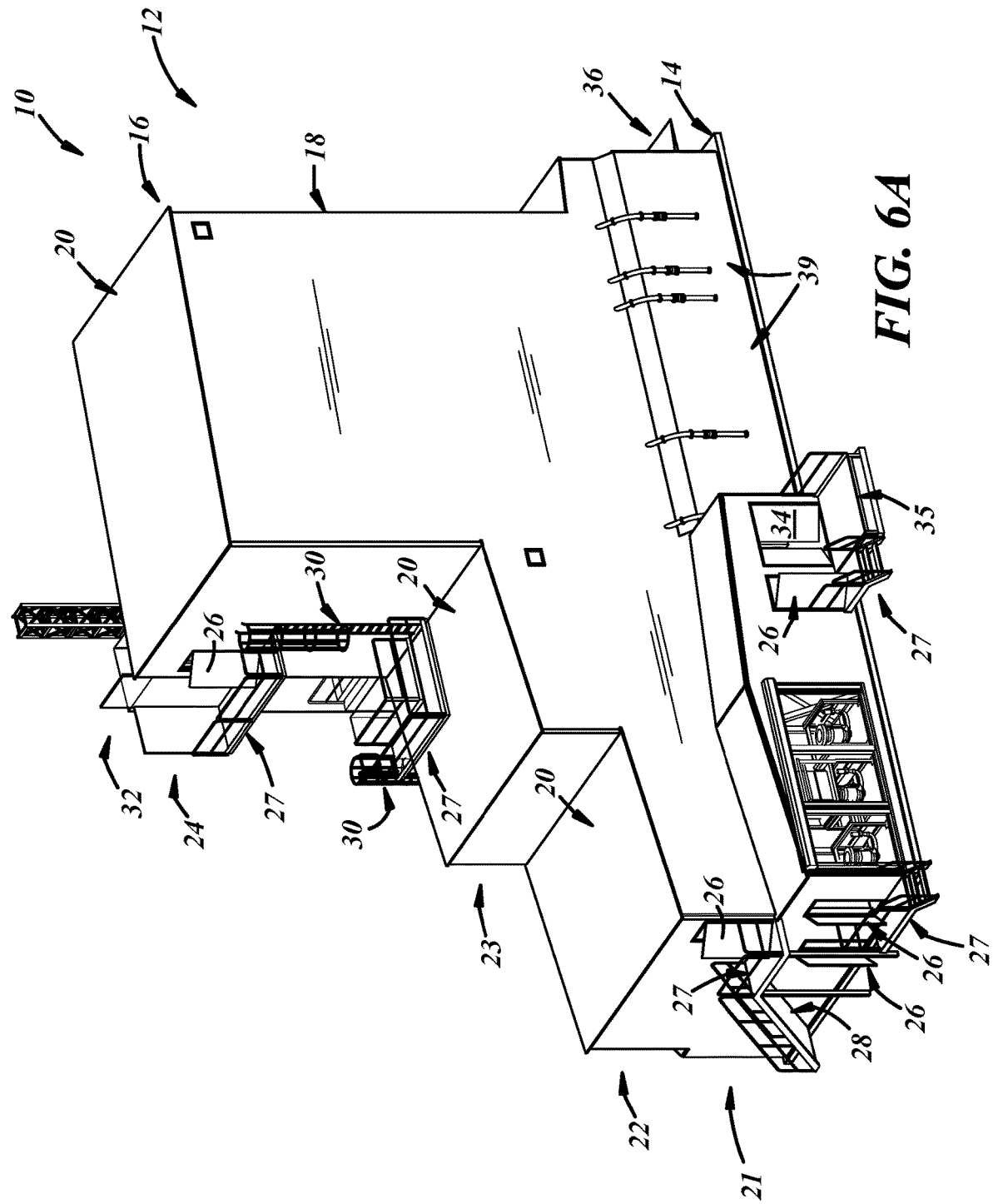
FIG. 6A is a perspective view of a bulk material handling system in accordance with another illustrative embodiment of the present disclosure, illustrating a building having a roof, cladding, elevator, stairs, ladders, and platforms.
Figure 6B:
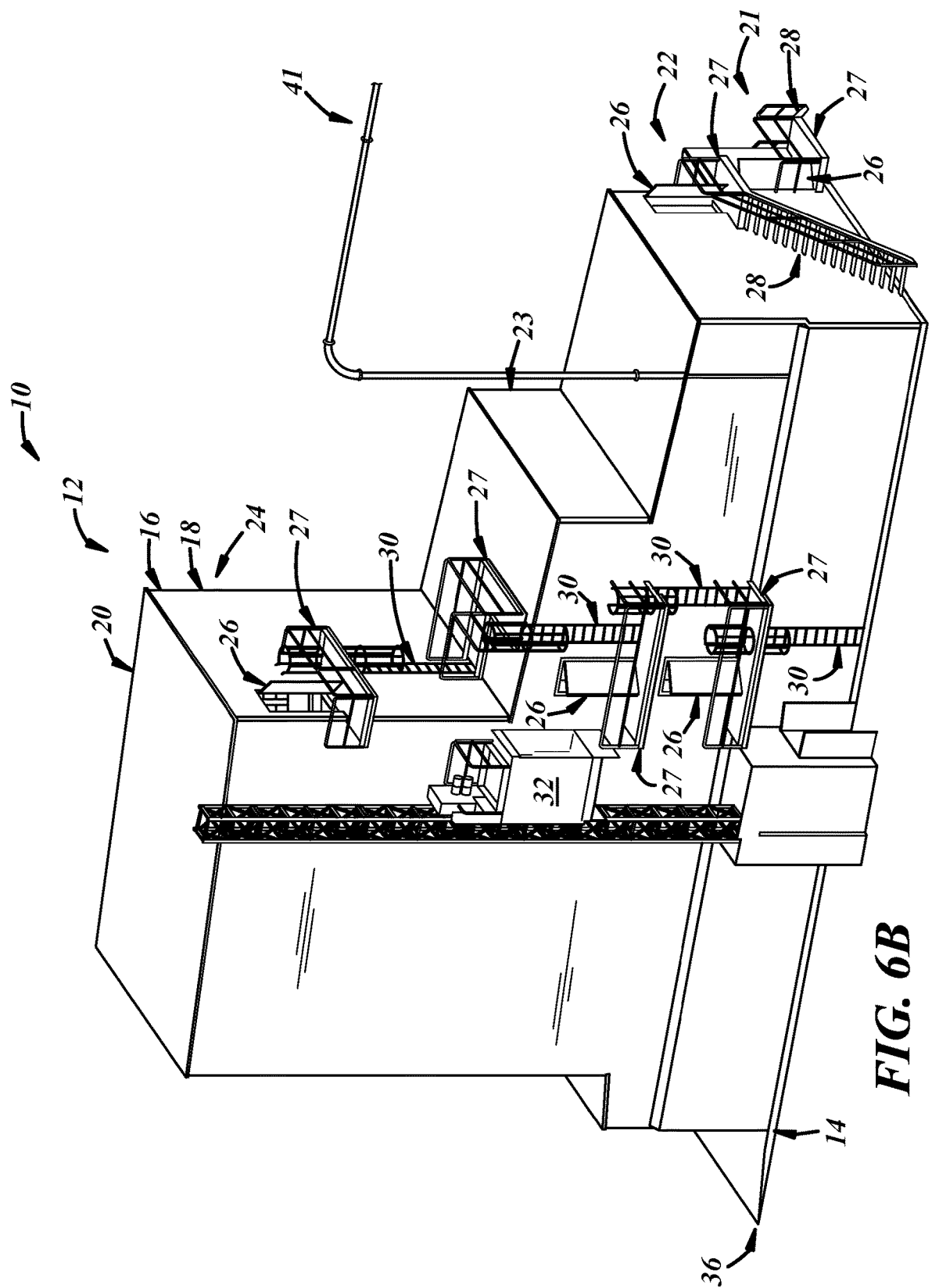
FIG. 6B is different perspective view of the system of FIG. 6A, illustrating the building with the roof, cladding, elevator, stairs, ladders, and platforms.
Figure 7A:
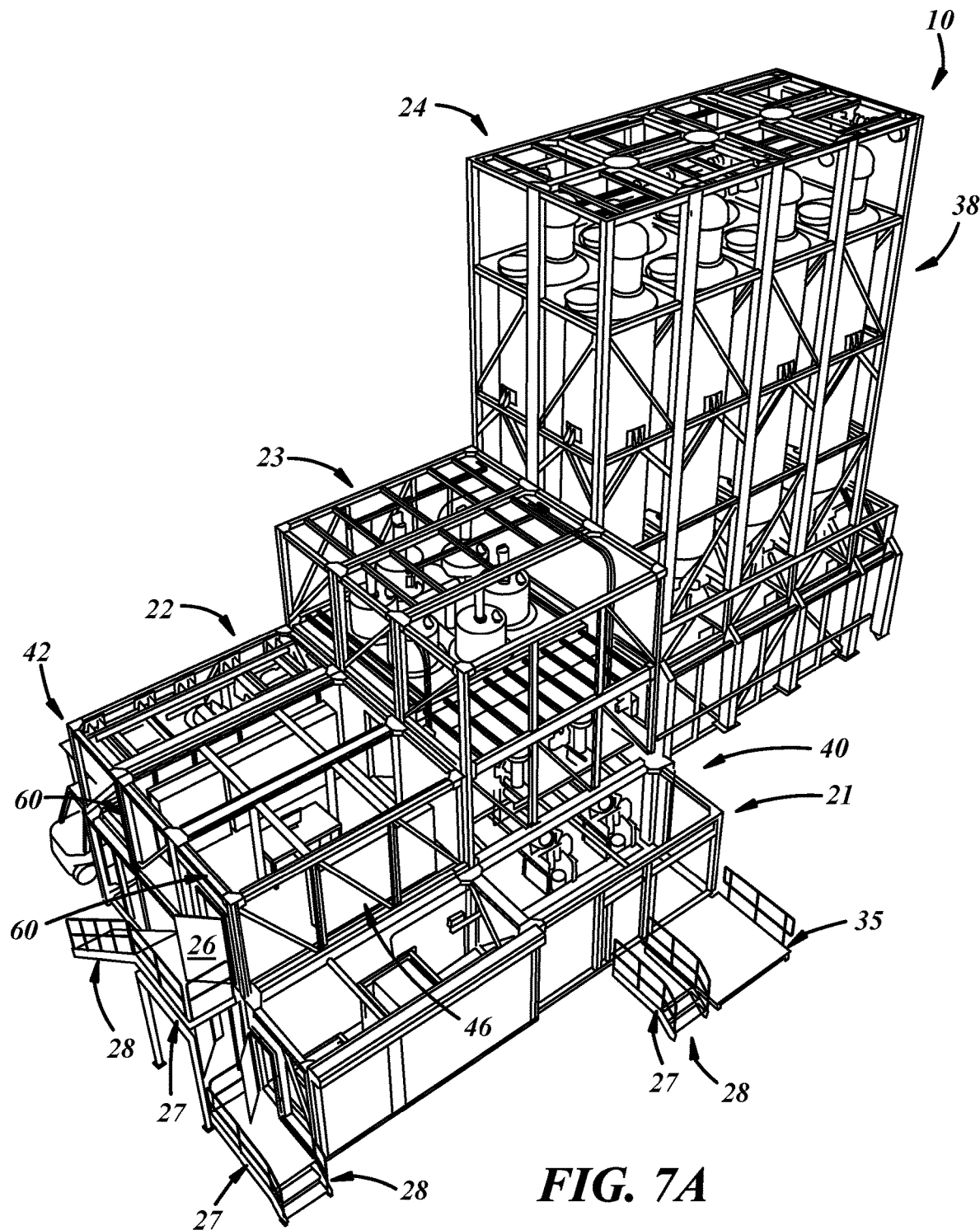
FIG. 7A is another perspective view of the system corresponding to FIG. 6A, without the roof, cladding, elevator, and ladders.

With reference to FIGS. 6A and 6B, the installation 12' also includes multiple habitable levels, including a base or first level 21, an intermediate or second level 22, an upper or third level 23, and an attic or fourth level 24. Also, as used herein, the term "habitable" means that there is standing room for an adult human in the particular space involved and there is some means of ingress/egress to/from the space while walking such as a doorway, stairway, and/or the like. The installation 12' further includes egress doors 26, egress platforms 27, stairs 28, ladders 30, and an elevator 32 to facilitate access to the egress platforms 27 and doors 26. The installation 12 additionally includes loading doors 34 and loading platforms 35 and one or more ramps 36. Notably, the building 16' is constructed of many modules, including modular walls used to construct a base frame for the first level, and modular frames for the second, third, and fourth levels, as will be discussed in detail below.

With reference to FIGS. 7A through 13 generally, a bulk material handling system 10 includes several subsystems that occupy a volumetric envelope much smaller than conventional batch houses such that the system 10 likewise requires a smaller volumetric envelope than conventional glass batch houses. The bulk material handling system 10 may be a glass bulk material handling system configured to receive and store glass feedstock or "glass batch." The glass batch includes glassmaking raw materials, including glass feedstock "majors" and "minors" and also may include cullet in the form of recycled, scrap, or waste glass. The bulk material handling system receives glass batch bulk materials and combines them into doses and provides the doses to a downstream hot-end system of a glass factory adjacent to or part of the bulk material handling system.

The bulk material handling system 10 includes a new architectural installation 12 and new subsystems and equipment supported and sheltered by the installation 12. The installation 12 includes a concrete foundation 14 having a floor which may include, for example, a four to six-inch-thick slab, and a bulk material handling building 16 on the foundation including walls 18 and a roof 20. The system 10 is substantively the same as that previously described above with respect to FIGS. 1-5, with the exception that the system 10 may include fewer bulk handling storage containers. As will be described more specifically below with reference to the drawings, generally the system 10 may include only eight majors silos instead of 12 majors silos of the system 10' of FIGS. 1-5. Despite the reduction in such quantity of storage containers, the system 10 is still capable of supporting production output of a glass manufacturing system or factory at about 110 TPD.

The system 10 includes one or more of the following subsystems. A first bulk material, or majors, subsystem 38 is configured to receive, pneumatically convey, store, and gravity dispense majors bulk material. Glassmaking majors may include sand, soda, limestone, alumina, saltcake, and, in some cases, dust recovery material. Similarly, a second bulk material, or minors, subsystem 40 is configured to receive, pneumatically convey, and store minors bulk material from individual bulk material bags. Glassmaking minors may include selenium, cobalt oxide, and any other colorants, decolorants, fining agents, and/or other minors materials suitable for glassmaking. A bulk material discharging subsystem 42 is configured to receive bulk material from the majors and minors subsystems 38, 40 and transmit the bulk material to downstream bulk material processing equipment, for example, a glass melting furnace separate from and downstream of the bulk material handling system 10. A bulk material transfer or transport subsystem 44 is configured to receive bulk material from the majors and minors subsystems 38, 40, and transport the bulk material within, to, and from, the majors and minors subsystems 38, 40, and to and from the discharge subsystem 42. A controls subsystem 46 is in communication with various equipment of one or more of the other subsystems 38, 40, 42, 44, and is configured to control various aspects of the system 10. Those of ordinary skill in the art would recognize that the system 10 can be supplied with utility or plant electrical power, and can include computers, sensors, actuators, electrical wiring, and the like to power and communicate different parts of the system 10 together. Likewise, the system 10 can be supplied with plant or compressor pneumatic power/pressure, and can include valves, lubricators, regulators, conduit, and other like pneumatic components to pressurize and communicate different parts of the system 10 together.

With reference to FIG. 6A and/or 7A, the system 10 may be pneumatically closed from pneumatic input or receiving conduit 39 of the majors subsystem 38 to pneumatic output or transmitting conduit 43 of the discharging subsystem 42. The pneumatic receiving conduit 39 may extend through one or more walls 18 or roof 20 of the building 16 for accessibility to bulk transporters, e.g., trucks or rail cars (not shown), that bring bulk materials and that may have pressurized vessels to assist with pneumatic receiving and conveying of bulk material. The receiving conduit 39 has any suitable couplings for coupling to bulk transporters in a pneumatically sealed manner, wherein the bulk transporters may have pumps, valves, and/or other equipment suitable to pressurize the receiving conduit to push bulk material into the majors subsystem 38 and/or the batch handling system 10 itself may include pumps, valves, pressurized plant air plumbing, and/or other equipment suitable to apply positive and/or negative (vacuum) pressure to the input conduit to push and/or pull bulk material into the majors and minors subsystems 38, 40.

With reference to FIGS. 6B and/or 7B, the transmitting conduit 43 may extend through one or more walls 18 or the roof 20 of the building 16 for transmission to downstream bulk material processing equipment, for instance, in a hot end subsystem of a glass manufacturing system (not shown). For example, the transmitting conduit 43 is pneumatically sealingly coupled to a receiver hopper at a glass melter in the hot end subsystem (not shown). The conduit 43 may have any suitable couplings for coupling to the receiver hopper in a pneumatically sealed manner. Those of ordinary skill in the art would recognize that the bulk material handling system is pneumatically closed between the pneumatic receiving conduit and the pneumatic transmitting conduit. This is in contrast to conventional systems where bulk material is open to the surrounding environment. The phrase "pneumatically closed" means that the path, and the bulk materials following that path, from receiving conduit to transmitting conduit is/are enclosed, and not openly exposed to the surrounding environment, although not necessarily always sealed airtight.

Figure 14:
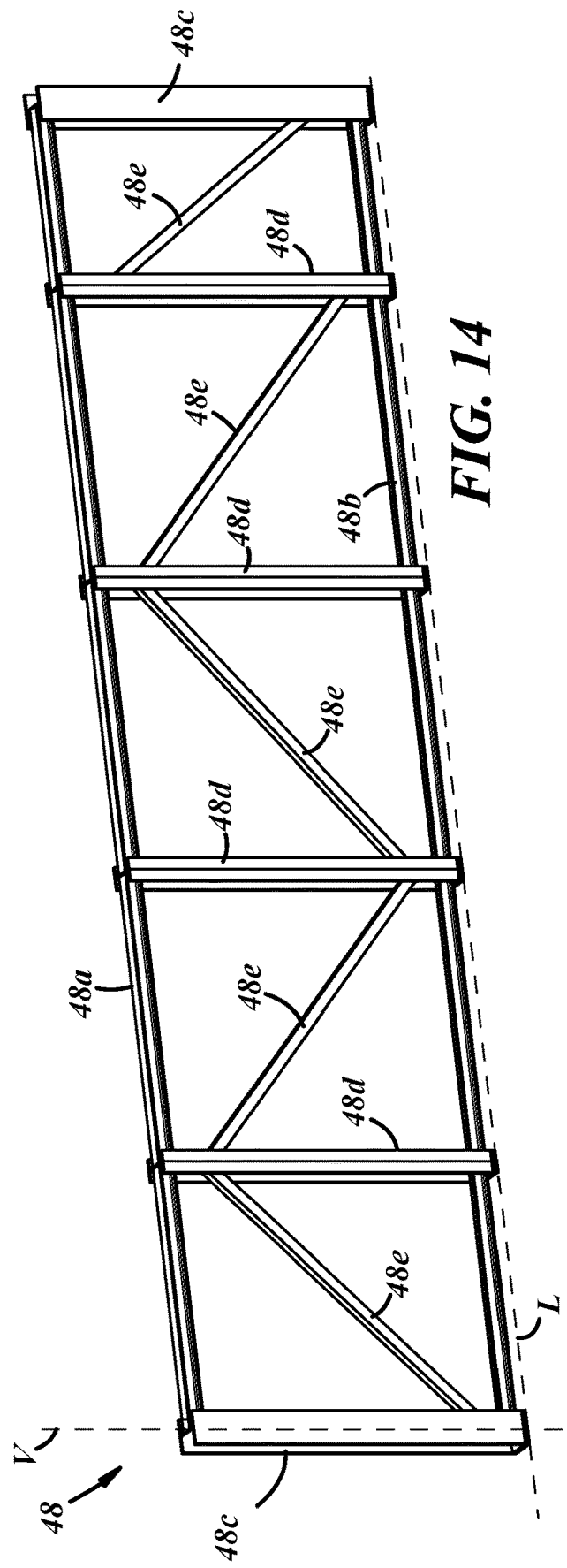
FIG. 14 is a perspective view of a modular wall of the system of FIG. 6A.

With reference now to FIG. 14, a representative modular wall 48 of the first level 21 of the building is constructed as a rectangular truss, having a longitudinal axis L and a vertical axis V, and including lower and upper beams 48a,b extending longitudinally and being vertically opposed from one another. The wall 48 also includes vertically extending end posts 48c and intermediate posts 48d longitudinally between the end posts 48c, and struts 48e extending obliquely between the beams 48a,b and connected to the posts 48c,d. The modular wall 48 may be preassembled at an equipment fabricator, shipped from the fabricator to a product manufacturer, and erected at the product manufacturer. The modular wall 48 may have exterior dimensions less than or equal to exterior dimensions of an intermodal freight container, more specifically, a height less than or equal to 9' 6" (2.896 m), a width less than or equal to 8' 6" (2.591 m), and a length less than or equal to 53' (16.154 m). With reference again to FIG. 7B, the modular wall 48 may be used as a portion of a base frame establishing the habitable first level 21 of the system 1 and spanning the majors subsystem 38, the minors subsystem 40, and the discharging subsystem 42.

Figure 15:
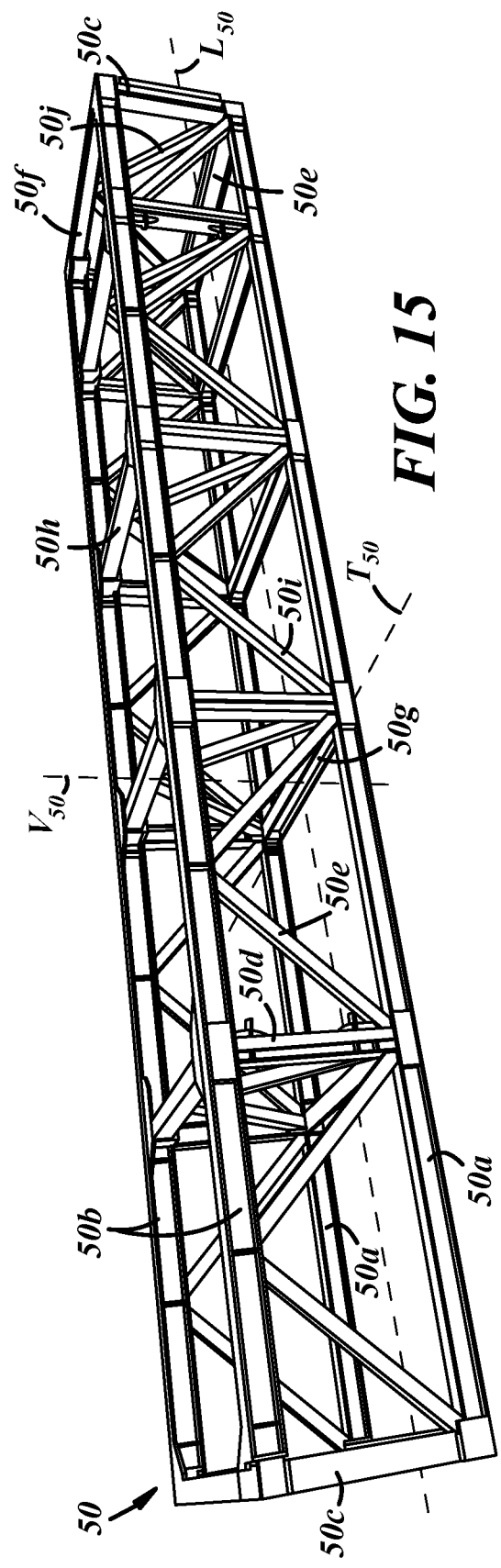
FIG. 15 is a perspective view of a dispenser modular frame of the system of FIG. 6A.

With reference now to FIG. 15, a representative horizontal or dispensing modular frame 50 is constructed as a rectangular box truss, having a longitudinal axis $L_{50}$, a transverse or lateral axis $T_{50}$, and a vertical axis $V_{50}$, including lower beams 50a extending longitudinally and being laterally opposed from one another, and including upper beams 50b extending longitudinally and being laterally opposed from one another. The frame 50 also includes posts 50c,d extending vertically between the lower and upper beams 50a,b and, more specifically, may include corner posts 50c extending vertically between ends of the lower and upper beams 50a,b, and intermediate posts 50d extending vertically between intermediate portions of the lower and upper beams 50a,b between the ends thereof. The frame 50 also includes lower end cross-members 50e extending laterally between the lower beams 50a, and upper end cross-members 50f extending laterally between the upper beams 50b. Likewise, the frame 50 also may include lower intermediate cross-members 50g extending between portions of the lower beams 50a between the ends thereof, and upper intermediate cross-members 50h extending between portions of the upper beams 50b between the ends thereof. The frame 50 may also include one or more side struts 50i extending obliquely between the lower and upper beams 50a,b and end struts 50j extending between lower and upper end cross-members 50e,f opposite longitudinal ends of the frame 50. The modular frame 50 may have exterior dimensions less than or equal to exterior dimensions of an intermodal freight container, more specifically, a height less than or equal to 9' 6" (2.896 m), a width less than or equal to 8' 6" (2.591 m), and a length less than or equal to 40' (16.154 m).

Figure 16:
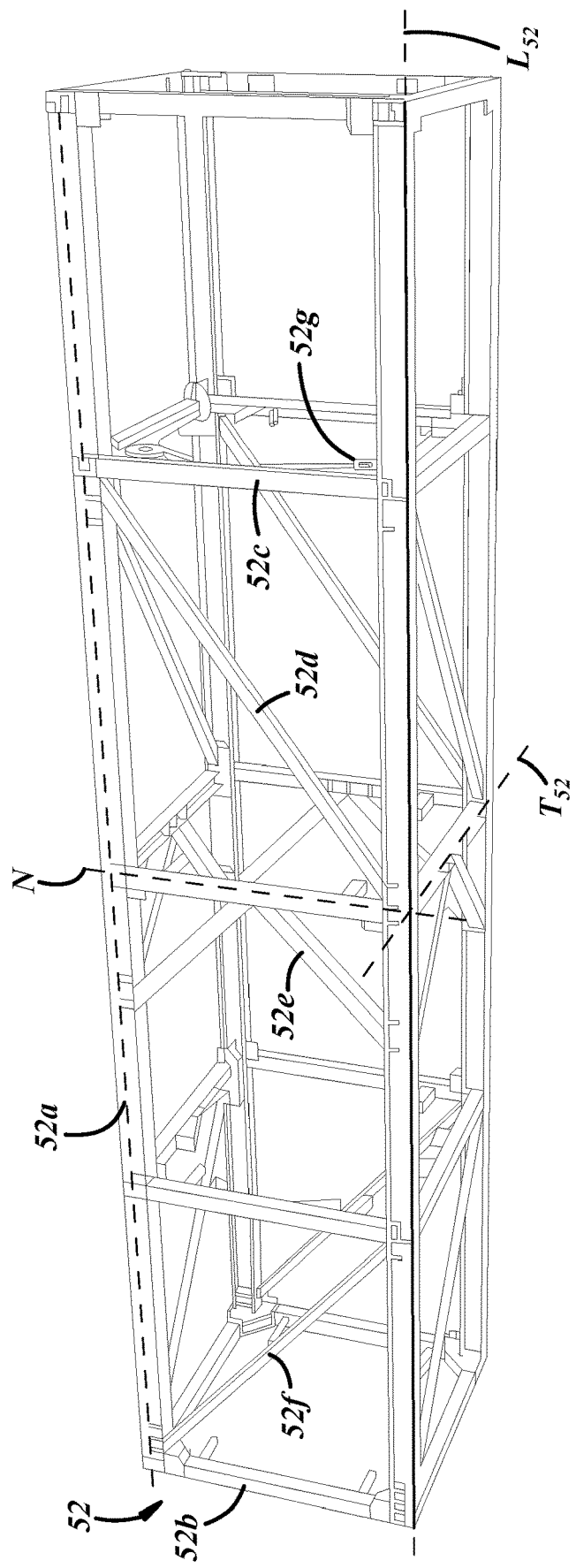
FIG. 16 is a perspective view of silo modular frame of the system of FIG. 6A.

With reference now to FIG. 16, a representative vertical or silo modular frame 52 is constructed as a rectangular box truss, having a longitudinal axis $L_{52}$, a transverse or lateral axis $T_{52}$, and a normal axis N, and including corner beams 52a extending longitudinally, and being laterally and normally opposed from one another, and end cross-members 52b and intermediate cross-members 52c extending laterally and normally between the beams 52a. The frame 52 also includes one or more longer struts 52d extending obliquely between the beams 52a and may be attached to the beams 52a. The frame 52 further includes one or more shorter struts 52e extending between the beams 52a and a corresponding cross-member 52c, and one or more intermediate struts 52f extending between the beams 52a and coupled thereto. Finally, the frame 52 also may include platform brackets 52g coupled to upper intermediate cross-members 52c and configured to support a platform (not shown) thereon to establish a habitable attic level of the system. The modular frame 52 may have exterior dimensions less than or equal to exterior dimensions of an intermodal freight container, more specifically, a height less than or equal to 9' 6" (2.896 m), a width less than or equal to 8' 6" (2.591 m), and a length less than or equal to 40' (12.192 m).

Figure 7B:
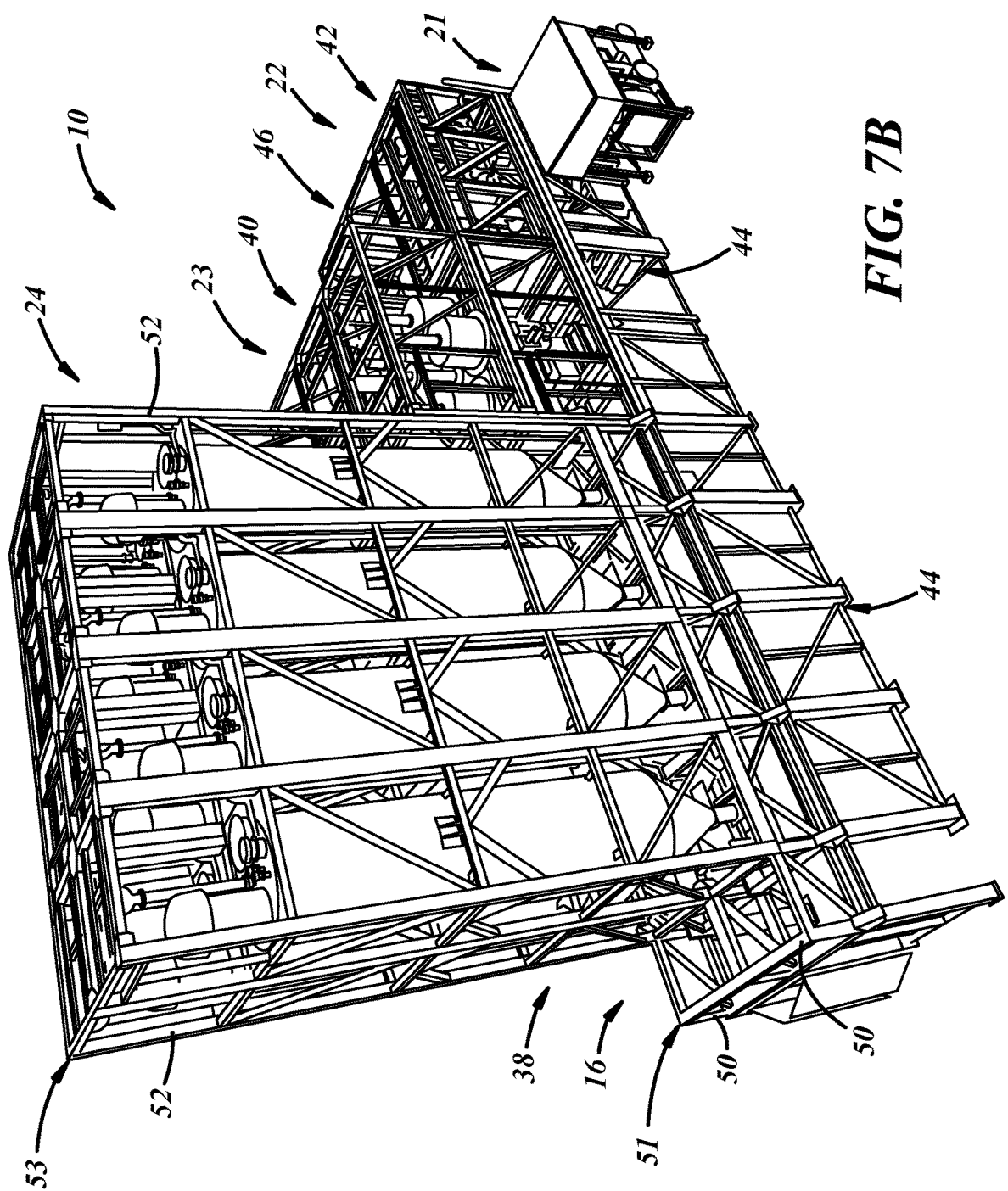
FIG. 7B is another perspective view of the system corresponding to FIG. 6B, without the roof, cladding, elevator, and ladders.
Figure 8:
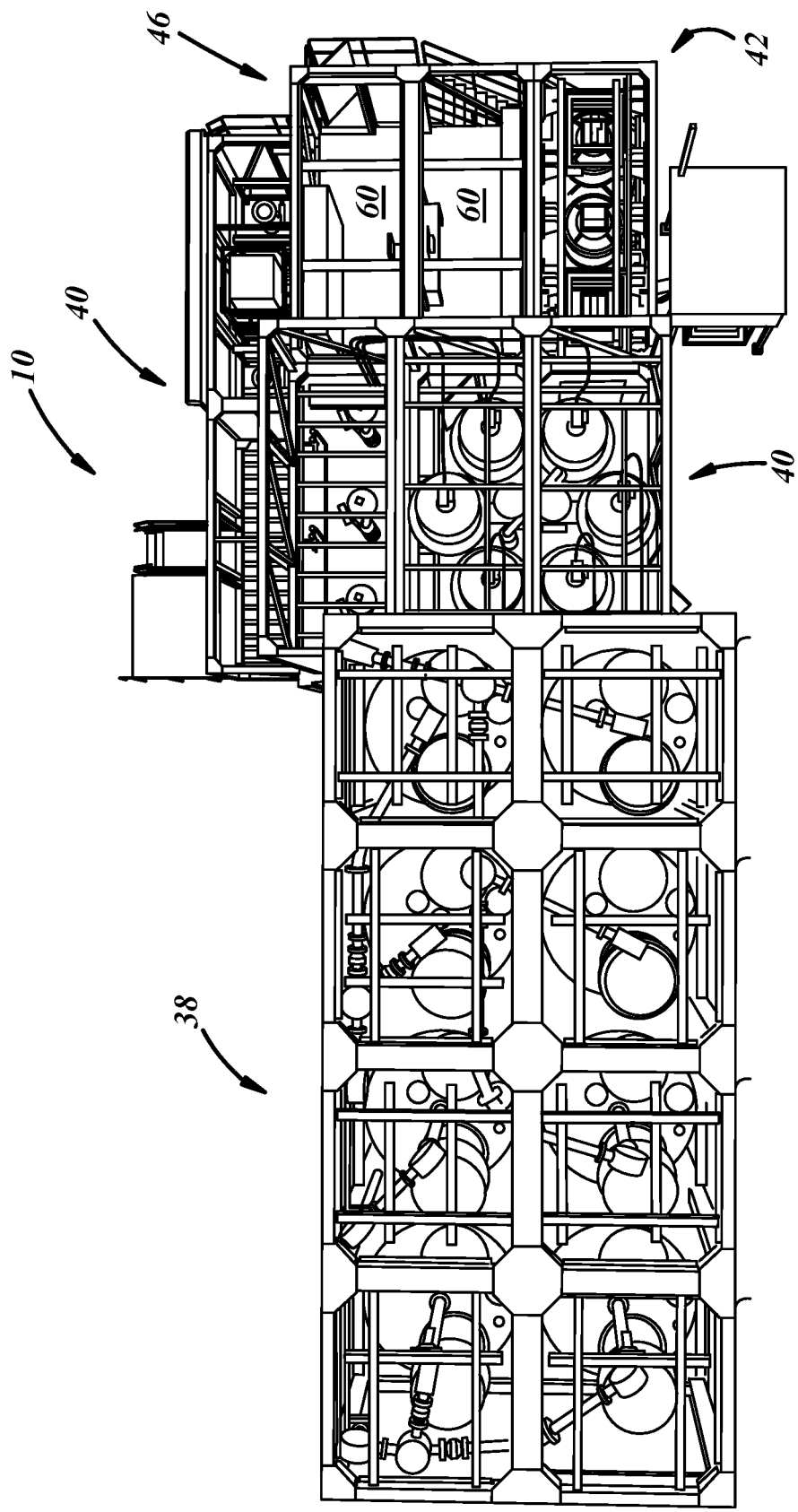
FIG. 8 is a top view of the system of FIG. 6A.
Figure 9:
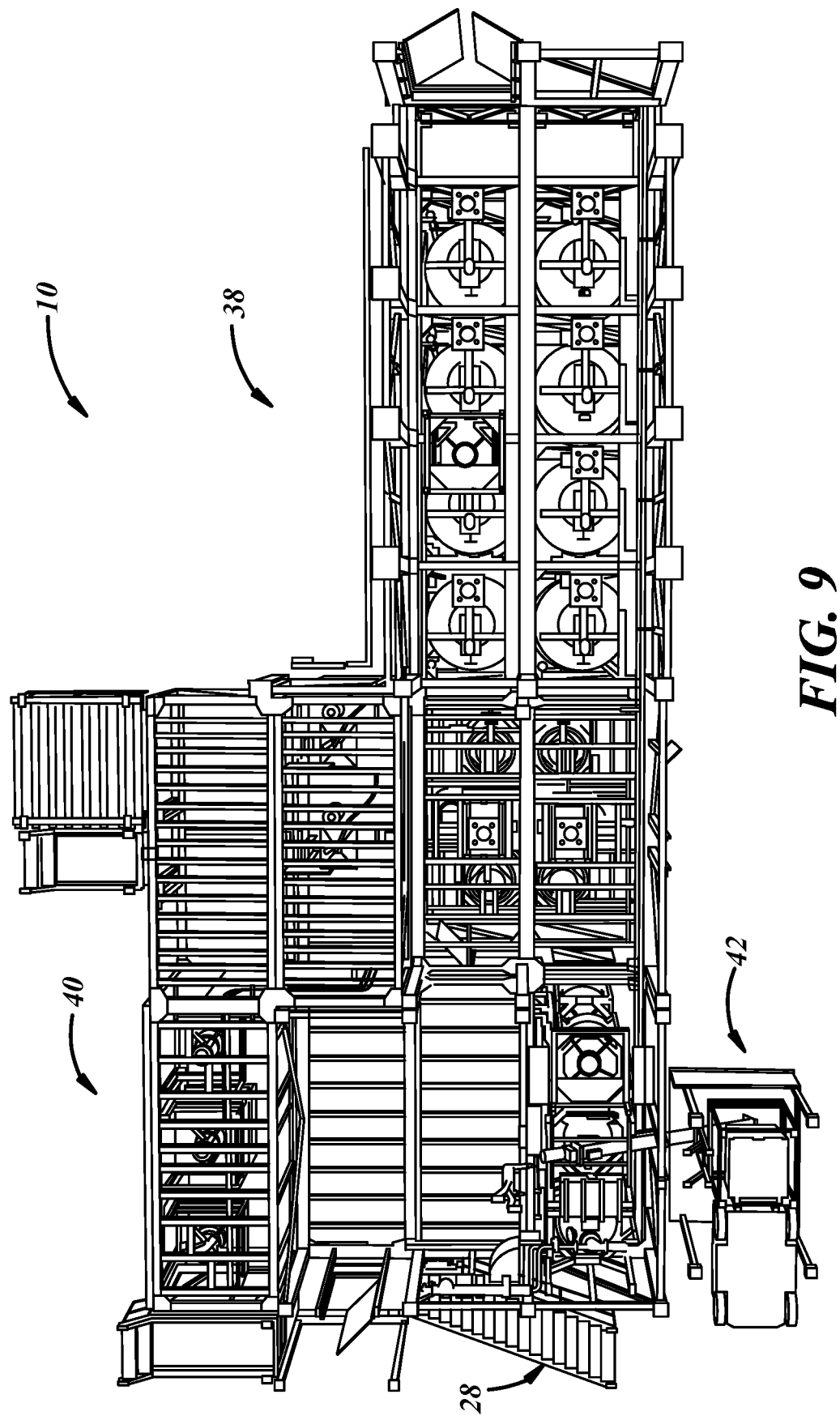
FIG. 9 is a bottom view of the system of FIG. 6A.
Figure 10:
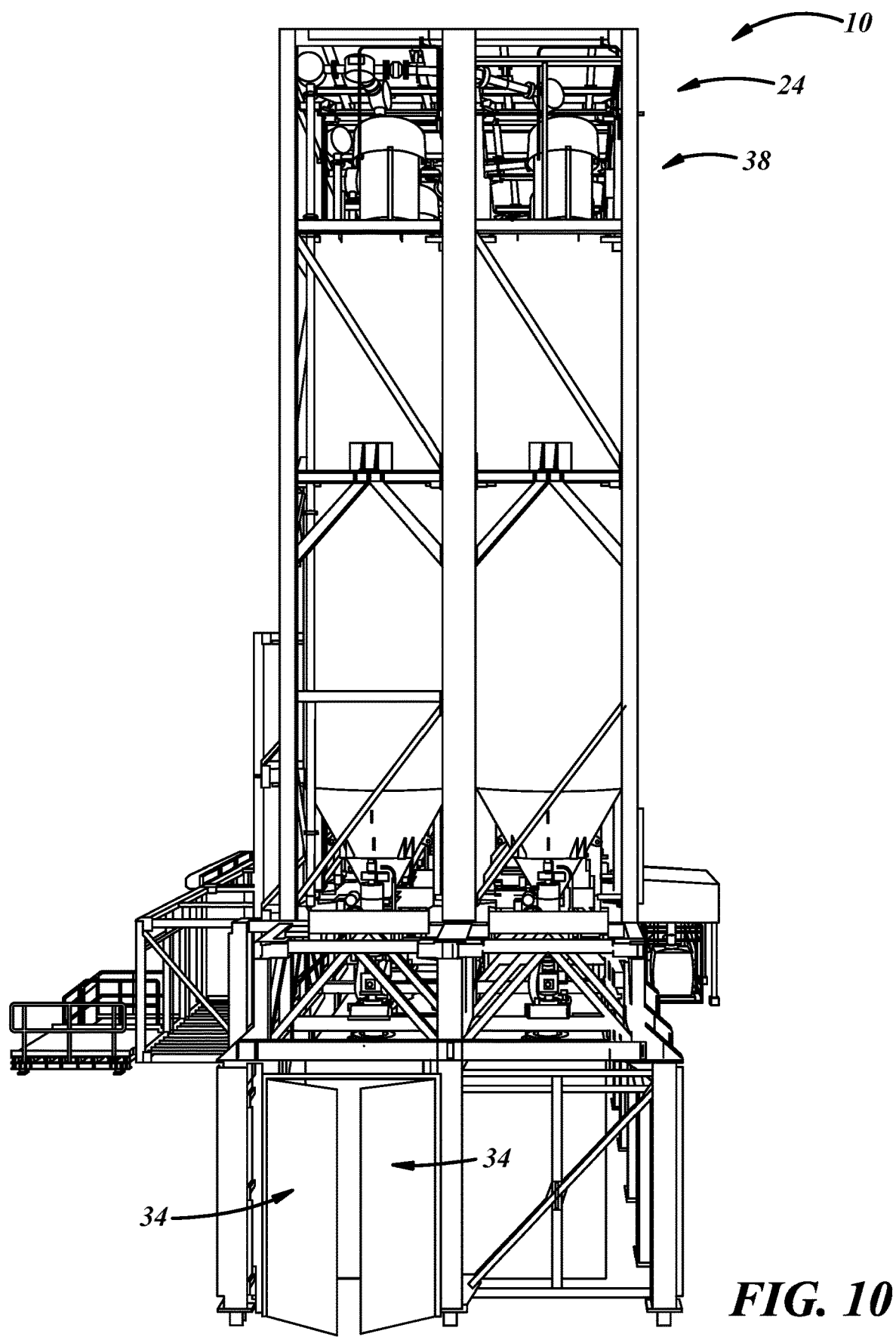
FIG. 10 is an upstream end view of the system of FIG. 6A.
Figure 11:
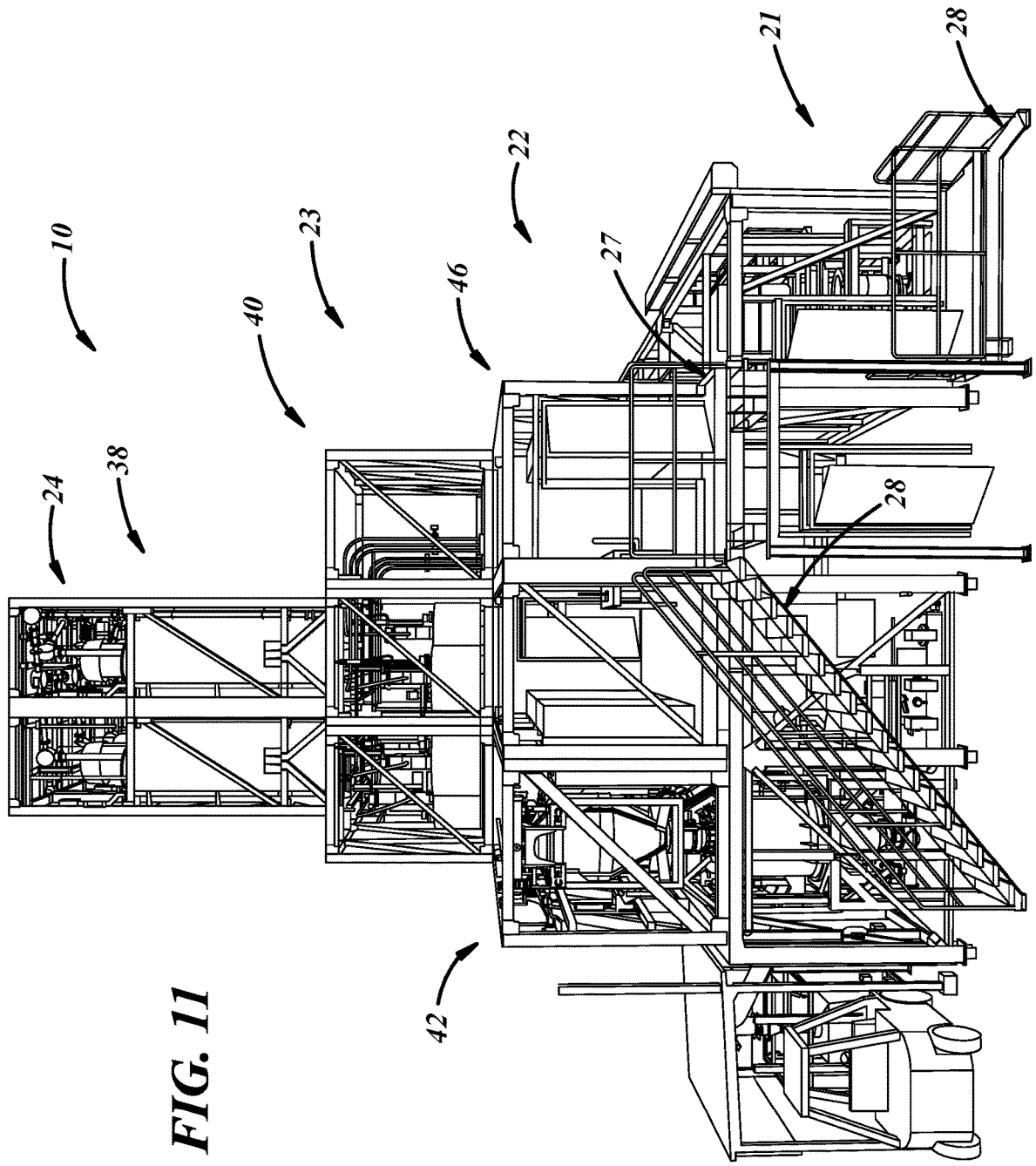
FIG. 11 is a downstream end view of the system of FIG. 6A opposite that of FIG. 10.
Figure 12:
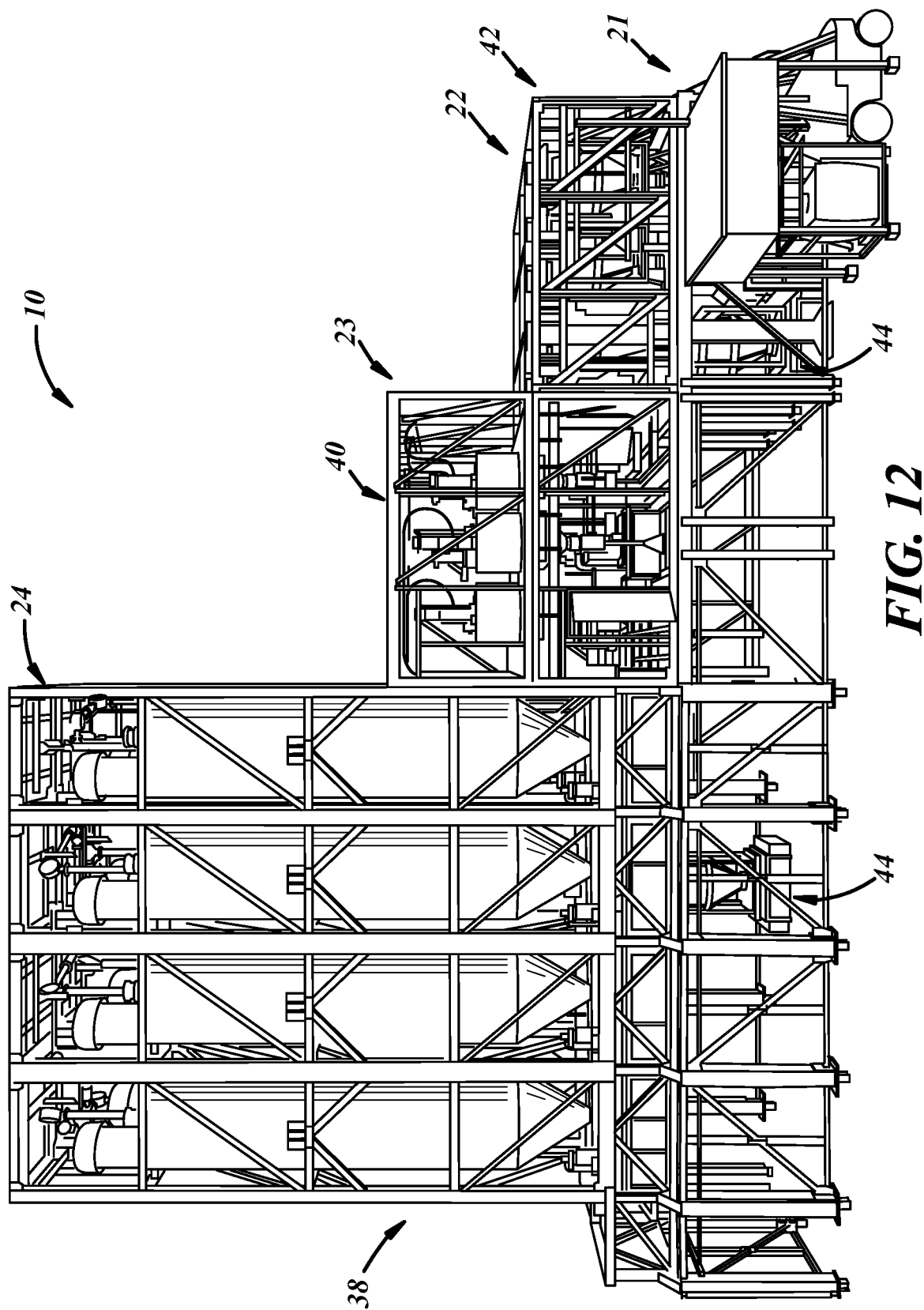
FIG. 12 is a side view of the system of FIG. 6A.
Figure 13:
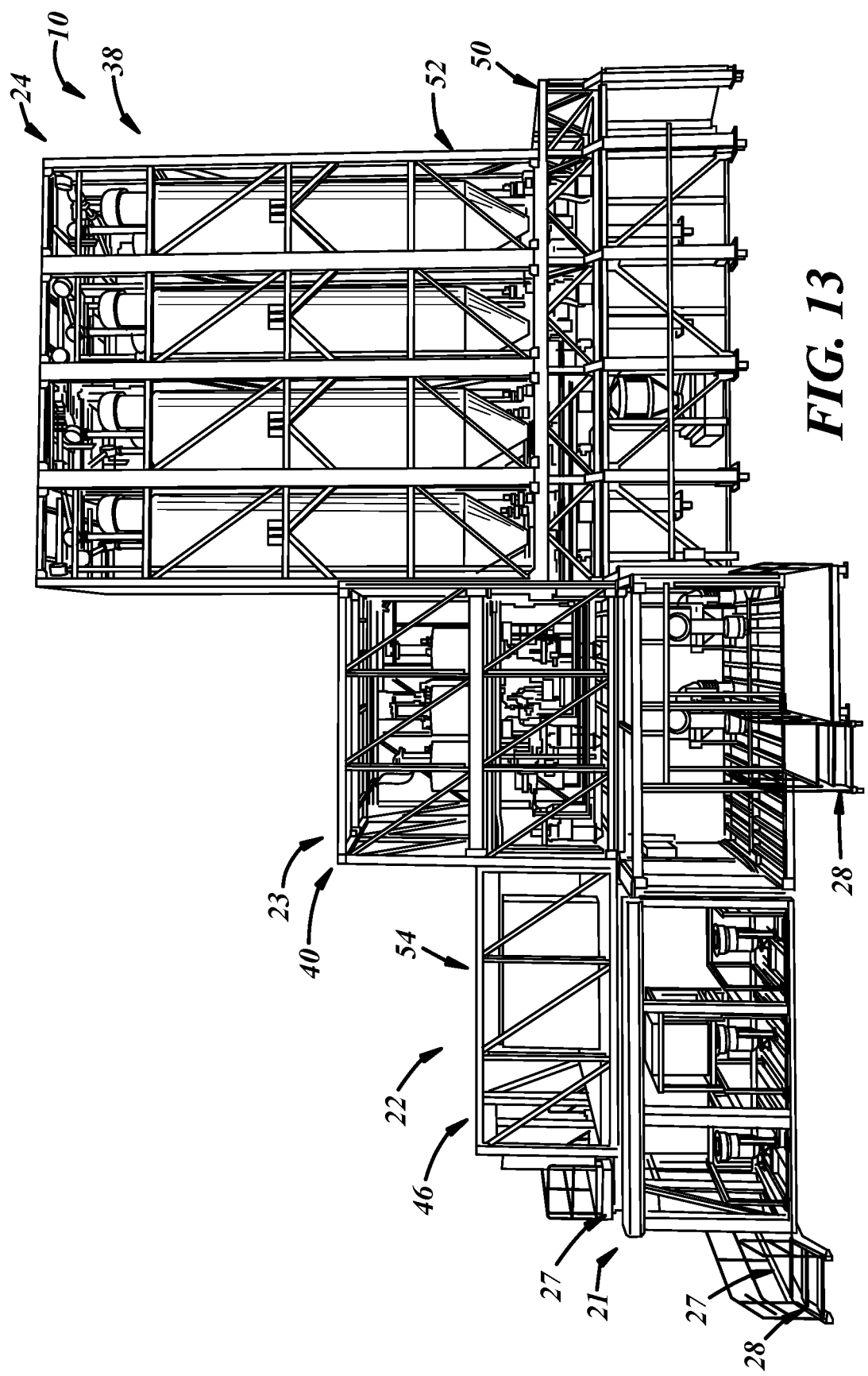
FIG. 13 is another side view of the system of FIG. 6A opposite that of FIG. 12.

With reference to FIG. 7B, the majors subsystem 38 includes a dispensing level frame 51 constituted from two of the horizontal modular dispensing frames 50 of FIG. 15 situated side-by-side and carried on the base frame, and a storage container frame constituted from eight of the vertical modular storage container frames 52 of FIG. 16 situated in a 4×2 array carried on the dispensing level frame.

Figure 17B:
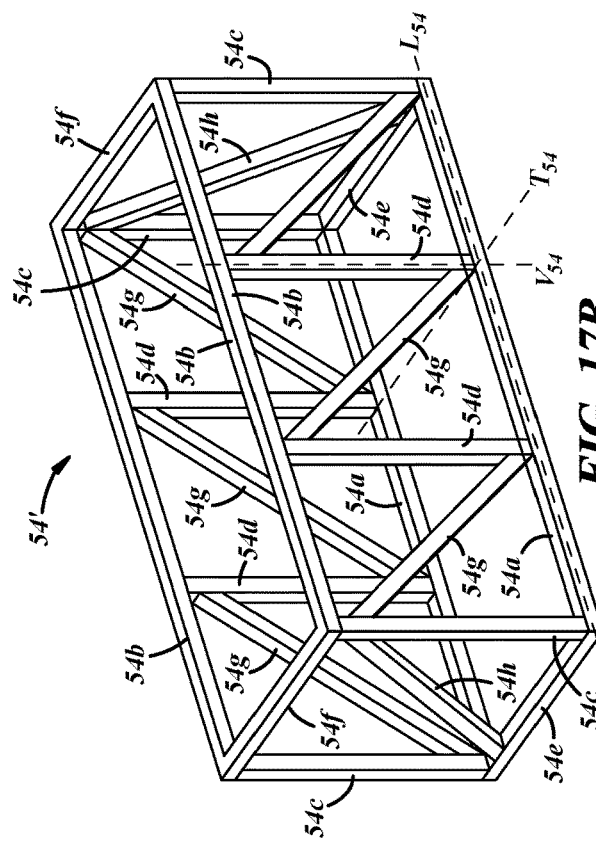
FIG. 17B is a perspective view of another multi-purpose modular frame of the system of FIG. 6A.
Figure 17A:
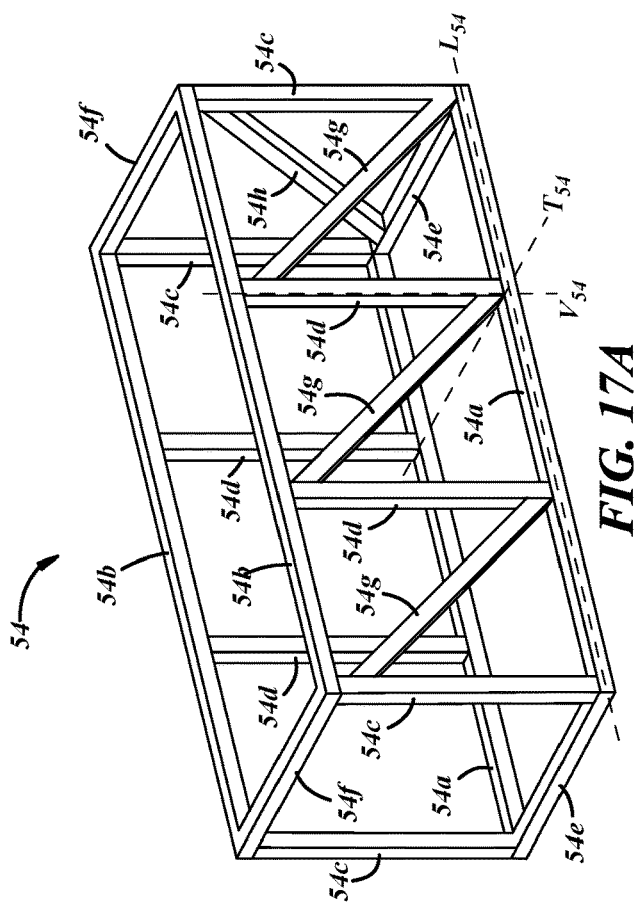
FIG. 17A is a perspective view of a multi-purpose modular frame of the system of FIG. 6A.

With reference to now FIG. 17A, a representative horizontal or multi-purpose modular frame 54 is constructed as a rectangular box truss, having a longitudinal axis $L_{54}$, a transverse or lateral axis T$_{54}$, and a vertical axis V$_{54}$, including lower beams 54*a* extending longitudinally and being laterally opposed from one another, and including upper beams 54*b* extending longitudinally and being laterally opposed from one another. The frame 54 also includes posts 54*c,d* extending vertically between the lower and upper beams 54*a,b*. The posts 54*c* may include corner posts 54*c* extending vertically between ends of the lower and upper beams 54*a,b*, and intermediate posts 54*d* extending vertically between intermediate portions of the lower and upper beams 54*a,b* between the ends thereof. The frame 54 also includes lower end cross-members 54*e* extending laterally between the lower beams 54*a*, and upper end cross-members 54*f* extending laterally between the upper beams 54*b*. Although not shown, the frame 54 also may include lower intermediate cross-members extending between intermediate portions of the lower beams 54*a* between the ends thereof. The frame 54 may also include one or more struts 54*g,h* extending obliquely between the lower and upper beams 54*a,b*, for example, side struts 54*g* extending between lower and upper beams 54*a,b* on opposite lateral sides of the frame 54 and may be coupled to the beams 54*a,b* and/or posts 54*c,d*, and/or may include end struts 54*h* extending between lower and upper end cross-members 54*e,f* on one or both longitudinal ends of the frame 54. With reference to FIG. 17B, another multi-purpose modular frame 54' may be arranged to add struts 54*g,h* such that the quantity and arrangement of struts 54*g,h* may be configured for particular application locations for example, where earthquake, high winds, and/or snow are prevalent. The modular frames 54, 54' may have exterior dimensions less than or equal to exterior dimensions of an intermodal freight container, more specifically, a height less than or equal to 9' 6" (2.896 m), a width less than or equal to 8' 6" (2.591 m), and a length less than or equal to 20' (6.096 m), such that two modules 54, 54' could be laid end to end and be shipped like a 40' intermodal freight container.

Figure 18:
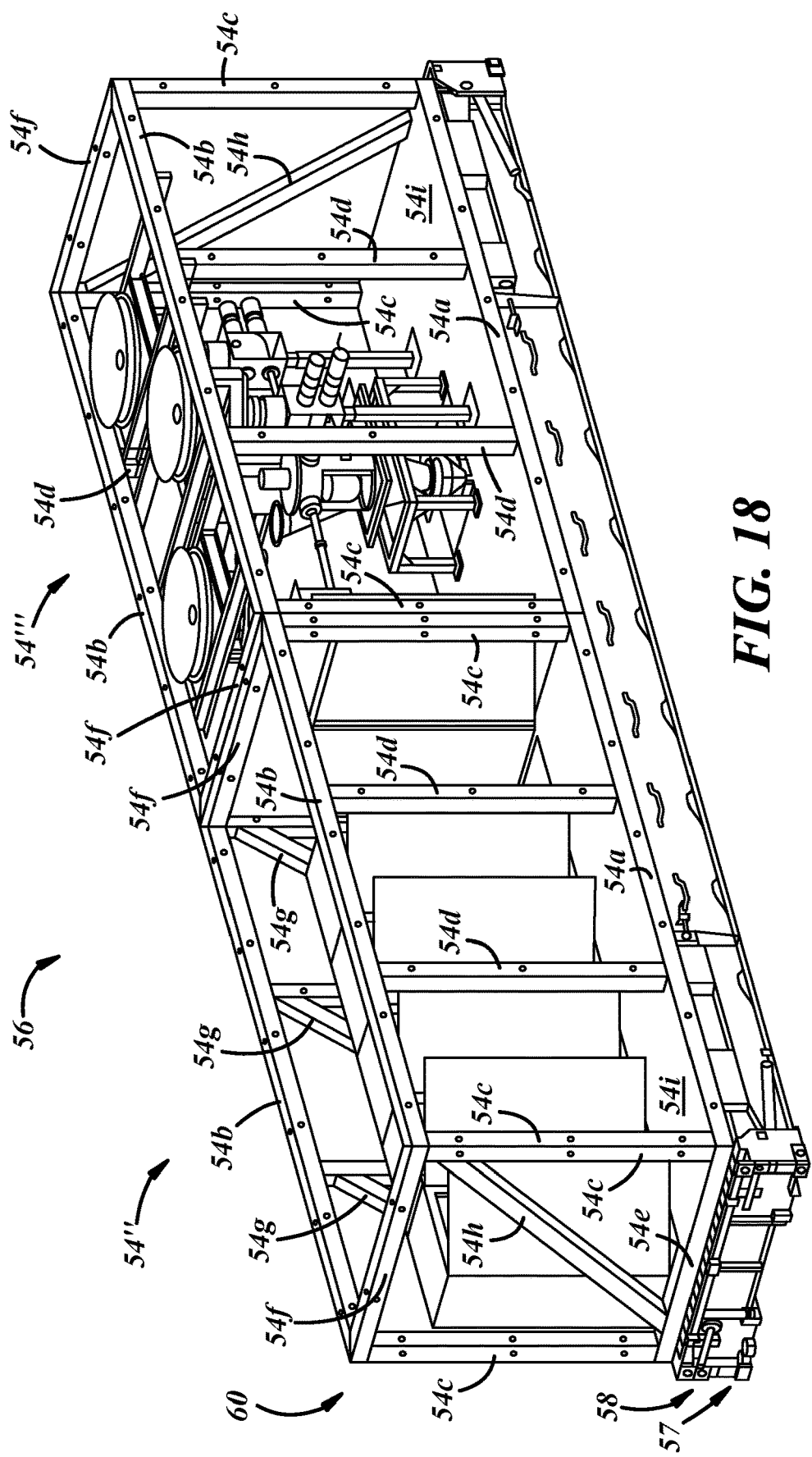
FIG. 18 is a perspective view of a rack carrying additional multi-purpose modular frames and related equipment of the system of FIG. 6A.

With reference now to FIG. 18, two or more multi-purpose modular frames 54", 54''' or any of the other modular frames 50, 52, 54, 54' (FIGS. 15-17B) disclosed herein may share common exterior dimensions such that the frames can be carried together on a common pallet, and can be easily aligned with one another to facilitate positioning and assembling them together on site. In fact, many of the modular frames may share identical exterior dimensions. More specifically, FIG. 18 illustrates modules 56 including the modular frames 54", 54''' that can be shipped on a standard seagoing flat rack 57 like a Mafi trailer or the like to constitute a rack and module assembly 58. On trucks, the modular frames 54", 54''' (shipped as modules with equipment carried by the modular frames) are designed to be self-supporting and may be wrapped in plastic foil or sheet or truck tarpaulins (not shown) to seal against dust, dirt, and sea water/air, and bottoms and tops may be covered with planks or sheets (not shown) of wood, metal, or plastic to protect the equipment in the modules 56. On ships, the modules 56 may be placed on the rack 57 and rolled onto a roll on/roll off ship at a departure seaport and, at an arrival sea port, the rack 57 is rolled off the ship and the modules 56 are placed on a truck. Accordingly, the modules 56 can be placed in a closed belly of the ship and not be exposed to sea water. The frames 54", 54''' also may include a platform 54*i* carried on the lower beams 54*a* and the lower cross-members 54*e* to establish a floor. The platform 54*i* may be constructed from a single panel or multiple panels.

U.S. Patent Application Publication No. 2022/0106104, filed on Oct. 1, 2021 and given Ser. No. 17/492,547, and which is assigned to the assignee hereof, is incorporated herein by reference in its entirety.

U.S. Patent Application Publication No. 2022/0106123, filed on Oct. 1, 2021 and given Ser. No. 17/492,548, and which is assigned to the assignee hereof, is incorporated herein by reference in its entirety.

U.S. Patent Application Publication No. 2022/0106106, filed on Oct. 1, 2021 and given Ser. No. 17/492,549, and which is assigned to the assignee hereof, is incorporated herein by reference in its entirety.

U.S. Patent Application Publication No. 2022/0106135, filed on Oct. 1, 2021 and given Ser. No. 17/492,550, and which is assigned to the assignee hereof, is incorporated herein by reference in its entirety.

With reference in general to all drawings of the drawing figures, one of ordinary skill in the art would recognize that the above-described systems, subsystems, apparatuses, and components, enable various bulk material handling methods, at least as follows. A bulk material handling method includes receiving bulk material and pneumatically conveying the bulk material via at least one of pressurized dilute phase, pressurized dense phase, hybrid dilute/dense phase, or vacuum draw conveyance into bulk material containers, and storing the bulk material in the bulk material containers. The method also includes dispensing the bulk material from the bulk material containers into a bulk material transporter, and transporting the bulk material transporter from the bulk material containers to a bulk material discharging system. The method further includes discharging the bulk material out of the bulk material transporter, including releasing the bulk material from the bulk material transporter into a bulk material transmitting vessel, and pneumatically transmitting the bulk material out of the bulk material transmitting vessel to downstream bulk material processing equipment.

As used in herein, the terminology "for example," "e.g.," "for instance," "like," "such as," "comprising," "having," "including," and the like, when used with a listing of one or more elements, is to be construed as open-ended, meaning that the listing does not exclude additional elements. Also, as used herein, the term "may" is an expedient merely to indicate optionality, for instance, of a disclosed embodiment, element, feature, or the like, and should not be construed as rendering indefinite any disclosure herein. Moreover, directional words such as front, rear, top, bottom, upper, lower, radial, circumferential, axial, lateral, longitudinal, vertical, horizontal, transverse, and/or the like are employed by way of example and not necessarily limitation.

Finally, the subject matter of this application is presently disclosed in conjunction with several explicit illustrative embodiments and modifications to those embodiments, using various terms. All terms used herein are intended to be merely descriptive, rather than necessarily limiting, and are to be interpreted and construed in accordance with their ordinary and customary meaning in the art, unless used in a context that requires a different interpretation. And for the sake of expedience, each explicit illustrative embodiment and modification is hereby incorporated by reference into one or more of the other explicit illustrative embodiments and modifications. As such, many other embodiments, modifications, and equivalents thereto, either exist now or are yet to be discovered and, thus, it is neither intended nor possible to presently describe all such subject matter, which will readily be suggested to persons of ordinary skill in the art in view of the present disclosure. Rather, the present disclosure is intended to embrace all such embodiments and modifications of the subject matter of this application, and equivalents thereto, as fall within the broad scope of the accompanying claims.

The invention claimed is:
1. A bulk material handling system, comprising:
a bulk material storage and dispensing subsystem including
bulk material conduit to receive bulk material from outside the bulk material handling system and convey the bulk material under pressure,
bulk material containers in downstream pneumatic communication with the bulk material conduit to receive and store the bulk material, and
bulk material dispensing equipment in communication with the bulk material containers to receive the bulk material from the bulk material containers and dispense the bulk material within the bulk material handling system;
a bulk material discharging subsystem including
a bulk material transmitting vessel to discharge the bulk material out of the bulk material handling system, and
a transporter handler; and
a bulk material transport subsystem including
a bulk material transporter configured to
receive bulk material from the bulk material storage and dispensing subsystem,
be transported between the bulk material storage and dispensing subsystem and the bulk material discharging subsystem,
be lifted and conveyed by the transporter handler of the bulk material discharging subsystem over the bulk material transmitting vessel of the bulk material discharging subsystem, and
release the bulk material received from the bulk material storage and dispensing subsystem into the bulk material transmitting vessel.

2. The bulk material handling system of claim 1, wherein the bulk material handling system occupies a volumetric envelope of less than 7,500 cubic meters and produces about 110 tons of glass per day, for a capacity adjusted size of less than 70 cubic meters per each ton of glass produced per day.

3. The bulk material handling system of claim 1, wherein the bulk material handling system occupies a volumetric envelope of less than 6,000 cubic meters and produces about 110 tons of glass per day, for a capacity adjusted size of less than 55 cubic meters per each ton of glass produced per day.

4. The bulk material handling system of claim 1, wherein the bulk material handling system occupies a volumetric envelope of about 5,350 cubic meters and produces about 110 tons of glass per day, for a capacity adjusted size of less than 50 cubic meters per each ton of glass produced per day.

5. The bulk material handling system of claim 1, wherein the bulk material transport subsystem also includes
a table having a platform and legs depending from the platform to support the platform,
a weigh scale configured to be carried on the platform of the table, and
the bulk material transporter configured to be carried on the weigh scale.

6. The bulk material handling system of claim 5, wherein the bulk material transporter includes
a transport bin, and
a cradle to carry the transport bin.

7. The bulk material handling system of claim 5, wherein the bulk material transport subsystem further includes
an automatically guided vehicle separate from the table and configured to
be traversable between the legs of the table and under the platform of the table,
be raisable from a lowered position to a raised position to lift the table, the weigh scale, and the bulk material transporter, and
move the table, the weigh scale, and the bulk material transporter between the bulk material storage and dispensing subsystem and the bulk material discharging subsystem.

8. The bulk material handling system of claim 7, wherein the bulk material discharging subsystem includes at least one of a vehicle charger for the automatically guided vehicle or a weigh scale charger for the weigh scale.

9. The bulk material handling system of claim 1, wherein the bulk material storage and dispensing subsystem includes
a majors subsystem including
a plurality of majors containers to store majors bulk material, and
majors dispensing equipment in communication with the majors containers, and a minors subsystem including
a plurality of minors containers to store minors bulk material, and
minors dispensing equipment in communication with the minors containers.

10. The bulk material handling system of claim 9, wherein the majors subsystem also includes
a majors dispensing module including a majors dispensing frame carrying the majors dispensing equipment, and
a plurality of majors container modules including majors container frames carried on the majors dispensing frame and carrying the majors containers; and
the minors subsystem also includes
a minors dispensing module including a minors dispensing frame carrying the minors dispensing equipment, and
a minors containing module including a minors containing frame carried by the minors dispensing frame and carrying the plurality of minors containers.

11. The bulk material handling system of claim 10, wherein the minors subsystem also includes
a large container unloading module including
a large container unloading frame, and
a large container unloading station carried by the large container unloading frame, and
a small container unloading module including
a small container unloading frame, and
a small container unloading station carried by the small container unloading frame.

12. The bulk material handling system of claim 11, wherein the minors subsystem further includes
a small container unloading filtration module including
a small container unloading filtration frame carried on the small container unloading frame, and
a small container unloading filter in fluid communication with the small container unloading station and carried by the small container unloading filtration frame.

13. The bulk material handling system of claim 12, wherein the minors subsystem additionally includes
a minors vestibule module including a minors vestibule frame coupled to, and positioned between, the large and small container unloading frames, and a minors auxiliary module including a minors auxiliary frame carried at a second level of the bulk material handling system on the small container unloading filtration frame.

14. The bulk material handling system of claim 10, wherein the bulk material discharging subsystem also includes
a bin handling module including a bin handling frame carrying portions of a bin handler.

15. The bulk material handling system of claim 14, further comprising:
a first level base frame, wherein the majors and minors dispensing frames, and the bin handling frame, are configured to be carried on the first level base frame.

16. The bulk material handling system of claim 15, further comprising:
a controls subsystem including
at least one controls module including at least one controls frame configured to be carried at a second level of the bulk material handling system on the first level base frame, and
controls equipment carried by the at least one controls frame.

17. The bulk material handling system of claim 16, wherein the at least one controls module also includes an exterior access doorway, and an interior doorway between the at least one controls module and the minors dispensing module.

18. The bulk material handling system of claim 15, wherein the minors dispensing module includes an exterior access doorway, and the minors containing module includes an exterior access doorway.

19. The bulk material handling system of claim 15, wherein the majors container modules include an attic level, and at least one of the majors container modules includes an exterior access doorway at the attic level.

20. The bulk material handling system of claim 10, wherein
the majors subsystem also includes
majors pneumatic inlet conduit in pneumatic communication with the majors containers, and
majors pneumatic power supply equipment in fluid communication with the bulk material handling system pneumatic inlet conduit,
the minors subsystem also includes
minors container unloading equipment, and
minors pneumatic inlet conduit in pneumatic communication with the minors container unloading equipment and with the minors containers, and
the bulk material discharging subsystem also includes
system pneumatic outlet conduit in pneumatic communication with the bulk material transmitting vessel, and
discharging pneumatic power supply equipment in fluid communication with the system pneumatic outlet conduit,
wherein the majors pneumatic inlet conduit, the majors containers, the majors dispensing equipment, the minors container unloading equipment, the minors pneumatic inlet conduit, the minors containers, the minors dispensing equipment, the bulk material transport bin, and a bulk material transmitting vessel are closeable such that the bulk material handling system is pneumatically closed from the majors pneumatic inlet conduit and the minors container unloading equipment to the system pneumatic outlet conduit.

* * * * *